US008588612B2

(12) United States Patent
Park et al.

(10) Patent No.: US 8,588,612 B2
(45) Date of Patent: Nov. 19, 2013

(54) OPTICAL DETECTION DEVICE IN WDM-PON AND METHOD FOR SAME

(75) Inventors: Soo-Jin Park, Seoul (KR); Young-Bok Choi, Gyeonggi-do (KR)

(73) Assignee: KT Corporation, Gyeonggi-do (KR)

( * ) Notice: Subject to any disclaimer, the term of this patent is extended or adjusted under 35 U.S.C. 154(b) by 151 days.

(21) Appl. No.: 12/856,345

(22) Filed: Aug. 13, 2010

(65) Prior Publication Data

US 2010/0303462 A1 Dec. 2, 2010

(30) Foreign Application Priority Data

Feb. 13, 2008 (KR) .................. 10-2008-0013049
Nov. 6, 2008 (KR) .................. 10-2008-0109980
Feb. 11, 2009 (KR) .................. 10-2009-0011121

(51) Int. Cl.
 *H04J 14/00* (2006.01)
(52) U.S. Cl.
 USPC ............... 398/68; 398/58; 398/65; 398/66; 398/67; 398/202; 398/205; 398/212
(58) Field of Classification Search
 USPC .............. 398/58–75, 183, 202–208; 359/135
 See application file for complete search history.

(56) References Cited

U.S. PATENT DOCUMENTS

| 4,989,200 | A |   | 1/1991  | Olshansky et al.         |
|-----------|---|---|---------|--------------------------|
| 5,027,436 | A |   | 6/1991  | Delavaux                 |
| 5,272,556 | A | * | 12/1993 | Faulkner et al. ... 398/71 |
| 5,657,307 | A | * | 8/1997  | Taneya et al. ... 369/116 |
| 5,905,586 | A | * | 5/1999  | Even ... 398/1           |
| 6,118,565 | A | * | 9/2000  | Frigo ... 398/68         |
| 6,782,211 | B1 | * | 8/2004  | Core ... 398/205         |
| 7,636,525 | B1 | * | 12/2009 | Bontu et al. ... 398/208 |
| 8,086,102 | B2 |   | 12/2011 | Kim et al.               |
| 2003/0058499 | A1 | * | 3/2003 | Reingand et al. ... 359/135 |
| 2004/0114939 | A1 |   | 6/2004 | Taylor                   |
| 2005/0100344 | A1 |   | 5/2005 | Hogan                    |
| 2009/0274470 | A1 | * | 11/2009 | Yoshino et al. ... 398/183 |

FOREIGN PATENT DOCUMENTS

| EP | 0910187 A2     | 4/1999  |
|----|----------------|---------|
| JP | 2007-274235    | 10/2007 |
| KR | 10-2005-0055098 A | 6/2005 |
| KR | 10-0768641 B1  | 10/2007 |
| KR | 10-2007-0109768 A | 11/2007 |

OTHER PUBLICATIONS

Masamichi Fujiwara et al., "Impact of Backreflection on Upstream Transmission in Wdm Single-Fiber Loopback Access Networks", Journal of Lightwave Technology, Feb. 2006, pp. 740-746, vol. 24, No. 2.

(Continued)

*Primary Examiner* — Li Liu
(74) *Attorney, Agent, or Firm* — IP Legal Services, LLC

(57) ABSTRACT

A optical detection apparatus includes: an optical splitting unit configured to split a seed lightwave and split upward signal light generated by an optical network unit, based on the seed lightwave; a first control unit configured to control polarizations of the split seed lightwaves based on a first electrical signal; a second control unit configured to control phases of the split seed lightwaves based on a second electrical signal; an optical coupling and signal conversion unit configured to couple the seed lightwaves, of which the polarization and phase are controlled, and the split upward signal lights, convert the coupled optical signals into the first and second electrical signals, and transfer the first and second electrical signals to the first and second control units, respectively; and a signal detection unit.

11 Claims, 13 Drawing Sheets

(56) References Cited

OTHER PUBLICATIONS

Govind P. Agrawal, "Fiber-Optic Communication Systems" Third Edition, 2002, Chapter 6, pp. 226-278, John Wiley & Sons, Inc.

A.W. Davis et al., "Phase Diversity Techniques for Coherent Optical", Journal of Lightwave Technology, Apr. 1987, pp. 561-572, vol. LT-5, No. 4

\* cited by examiner

<Balanced coherent receiver>

OPTICAL DETECTION DEVICE IN WDM-PON AND METHOD FOR SAME

CROSS-REFERENCE(S) TO RELATED APPLICATIONS

This application is a continuation of PCT/KR2009/000703 filed on Feb. 13, 2009, which claims priority of Korean patent application number 10-2008-0013049 filed on Feb. 13, 2008, Korean patent application number 10-2008-0109980 filed on Nov. 6, 2008, and Korean patent application number 10-2009-0011121 filed on Feb. 11, 2009. The disclosure of each of the foregoing applications is incorporated herein by reference in its entirety.

BACKGROUND OF THE INVENTION

1. Field of the Invention

Exemplary embodiments of the present invention relate to an optical detection apparatus and method in a Wavelength Division Multiplexing-Passive Optical Network (WDM-PON) based on a laser seed lightwave; and, more particularly, to an optical detection apparatus and method in a WDM-PON, which detects an electrical signal by controlling the phase and polarization of seed lightwaves and upward signal lights in real time (First embodiment), detects an electrical signal by controlling only the phase of seed lightwaves and upward signal lights in real time (Second embodiment), and detects an electrical signal without controlling the phase and polarization of seed lightwaves and upward signal lights in real time (Third embodiment).

2. Description of Related Art

The WDM-PON refers to a network which connects an optical line terminal (OLT) of a central office (CO) of a communication service provider to optical network units (ONU) of subscribers through passive optical elements, and distributes and transmits an optical signal including a variety of multiplexed data to the respective ONUs.

Recently, a WDM-PON system based on a laser seed lightwave has been actively researched. The WDM-PON system is implemented in such a manner that the CO uses a laser light source as a seed lightwave and the subscribers modulate and amplify an upward signal by using a reflective modulator such as a reflective semiconductor optical amplifier (R-OSA).

Meanwhile, a coherent detection scheme refers to technology which mixes signal light with reference light, of which the wavelength, polarization, and phase coincide with those of the signal light, such that a photodiode detects an optical current. Conventionally, it has been known that the implementation of the coherent detection scheme is very difficult and requires a lot of costs. Therefore, the coherent detection scheme is not suitable for being used as subscriber network technology. Accordingly, a direct detection scheme has been frequently used, which measures the total amount of light.

Meanwhile, a balanced coherent receiver is frequently used in the coherent detection scheme.

FIG. 5 is a diagram explaining an example of a general balanced coherent receiver.

Referring to FIG. 5, when reference light $E_{ref} = A_{ref} \cos(\omega t + \phi_{ref})$ and signal light $E_S = A_S \cos(\omega t + \phi_S)$ are inputted to the balanced coherent receiver, a detection current $I(t) \approx 2 A_s A_{Ref} \cos(\phi_S - \phi_{Ref})$ is outputted.

In general, however, the system performance of the WDM-PON system is considerably limited by light reflection in lines between the CO and the subscribers. The WDM-PON system using the above-described direct detection scheme has a problem that it does not guarantee accurate optical detection performance, because it performs the optical detection by simply adding seed lightwave and upward signal light. The problem will be described in detail as follows.

When a seed lightwave $E_{Seed}(t) = A_{Seed} \cos(\omega t + \phi_{Seed})$ having a wavenumber of $\omega$ is used, upward signal light obtained by modulating the seed lightwave may be expressed as $$E_S(t) = \sum_i A_{m,i} \cos(\omega_{m,i} t) \cos(\omega t + \phi_S),$$

and reflected light may be expressed as $$E_R(t) = \sum_i A_{R,i} \cos(\omega t + \phi_{R,i}).$$

Here, $\omega_{m,i}$ represents a basis frequency when the upward modulated signal is Fourier-expanded, $A_{m,i}$ represents the magnitude of $\omega_{m,i}$, and $\phi_S$ has a constant value. Furthermore, $\phi_{R,i}$ represents a phase of the reflected light having a random value, and $A_{R,i}$ represents the intensity of the reflected light having the phase of $\phi_{R,i}$. In the conventional direct detection scheme, when two signals are added and inputted to the photodiode, a detection current may be expressed as Equation 1 below.

$$\begin{aligned} I(t) &\approx \left[ \sum_i A_{m,i} \cos(\omega_{m,i} t) \cos(\omega t + \phi_S) + \sum_j A_{R,j} \cos(\omega t + \phi_j) \right]^2 \\ &= const + \sum_i A_{m,i}^2 [\cos(\omega_{m,i} t)]^2 + \sum_j A_{R,j}^2 + \\ &\quad 2 \sum_{i,j} A_{R,i} A_{R,j} \cos(\phi_i - \phi_j) + \\ &\quad \sum_{i,j} A_{m,j} A_{R,j} \cos(\omega_{m,i} t) \cos(\phi_S - \phi_j) \end{aligned} \quad \text{Eq. 1}$$

In Equation 1, $$\sum_i A_{m,i}^2 [\cos(\omega_{m,i} t)]^2$$

is a signal component, $$\sum_j A_{R,j}^2 + 2 \sum_i A_{R,i} A_{R,j} \cos(\phi_i - \phi_j)$$

is a DC component by the reflected light, and $$\sum_{i,j} A_{m,j} A_{R,j} \cos(\omega_{m,i} t) \cos(\phi_S - \phi_j)$$

is a component by the interference between the reflected light and the signal light.

FIG. 6 is a diagram explaining an RF power spectrum according to a general modulation scheme. FIG. 6 shows that the RF power spectrum changes according to the modulation scheme.

Referring to FIG. 6, when NRZ coding is performed, a DC component of a signal component increases. Accordingly, the signal component and a reflected light component cannot be separated.

Furthermore, referring to FIG. 6, when Manchester coding with no DC component as an upward signal is used, $$\sum_i A_{m,i}^2 [\cos(\omega_{m,i} t)]^2 \text{ and } \sum_{i,j} A_{m,i} A_{R,j} \cos(\omega_{m,i} t) \cos(\phi_S - \phi_j)$$

having a signal component and $$\sum_j A_{R,j}^2 + 2 \sum A_{R,i} A_{R,j} \cos(\phi_i - \phi_j)$$

having no signal component may be discriminated by an electrical filter. In this method, however, $$\sum_{i,j} A_{m,i} A_{R,j} \cos(\omega_{m,i} t) \cos(\phi_S - \phi_j)$$

having a signal component may act as noise depending on the phase $\phi_j$ of the reflected light and the phase $\phi_S$ of the signal light, while the Manchester coding removes much noise in comparison with the NRZ coding. That is, the conventional direct detection method does not remove noise caused by the reflected light perfectly.

In other words, the conventional method has a problem in that it does not remove noise caused by the reflected light perfectly. To solve such a problem, the present invention has been proposed.

SUMMARY OF THE INVENTION

An embodiment of the present invention is directed to an optical detection apparatus and method in a WDM-PON, which effectively detects an upward signal by using a coherent detection scheme.

That is, the optical detection apparatus and method in a WDM-PON detects an electrical signal by controlling the phase and polarization of seed lightwaves and upward signal lights in real time (First embodiment), detects an electrical signal by controlling only the phase of seed lightwaves and upward signal lights in real time (Second embodiment), and detects an electrical signal without controlling the phase and polarization of seed lightwaves and upward signal lights in real time (Third embodiment).

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an embodiment of the present invention, an optical detection apparatus includes: an optical splitting unit configured to split a seed lightwave and split upward signal light generated by an optical network unit, based on the seed lightwave; a first control unit configured to control polarizations of the split seed lightwaves based on a first electrical signal; a second control unit configured to control phases of the split seed lightwaves based on a second electrical signal; an optical coupling and signal conversion unit configured to couple the seed lightwaves, of which the polarization and phase are controlled, and the split upward signal lights, convert the coupled optical signals into the first and second electrical signals, and transfer the first and second electrical signals to the first and second control units, respectively; and a signal detection unit configured to couple the seed lightwave, of which the polarization and phase are controlled, and the split upward signal light, convert the coupled signals into an optical signal, and detect an upward signal corresponding to the upward signal light.

In accordance with another embodiment of the present invention, an optical detection method includes: splitting a seed lightwave into first to third seed lightwaves, and splitting upward signal light into first to third upward signal lights; controlling polarizations of the seed lightwaves based on a first electrical signal, and controlling phases of the seed lightwaves based on a second electrical signal; coupling the first seed lightwave, of which the polarization and phase are controlled, and the split first upward signal light, converting the coupled optical signal into the first electrical signal, and feeding back the first electrical signal; coupling the second seed lightwave, of which the polarization and phase are controlled, and the split second upward signal light, converting the coupled optical signal into the second electrical signal, and feeding back the second electrical signal; and coupling the third seed lightwave, of which the polarization and phase are controlled, and the split third upward signal light, and detecting an upward signal corresponding to the upward signal light.

In accordance with another embodiment of the present invention, an optical detection apparatus includes: an optical splitting unit configured to split a seed lightwave and split upward signal light generated by an optical network unit, based on the seed lightwave; a horizontal polarization controller configured to control horizontal polarization with respect to the split seed lightwaves; a vertical polarization controller configured to control vertical polarization with respect to the split seed lightwaves; a control unit configured to control phases of the seed lightwaves whose horizontal polarization is controlled and control phases of the seed lightwaves whose vertical polarization is controlled, based on electrical signals; an optical coupling and signal conversion unit configured to couple the seed lightwaves of which the horizontal polarization and phase are controlled and the seed lightwaves of which the vertical polarization and phase are controlled and the split upward signal lights, respectively, converting the coupled optical signals into the electrical signals, and transferring the electrical signals to the control unit; and a signal detection unit configured to detect an upward signal corresponding to the upward signal light, based on the converted electrical signals.

In accordance with another embodiment of the present invention, an optical detection method includes: splitting a seed lightwave into first and second seed lightwaves by controlling horizontal polarization for the seed lightwave, splitting the seed lightwave into third and fourth seed lightwaves by controlling vertical polarization for the seed lightwave, and splitting upward signal light into first to fourth upward signal lights; controlling phases of the first and second seed lightwaves whose horizontal polarization is controlled, based on a second electrical signal, and controlling phases of the third and fourth lightwaves whose vertical polarization is controlled, based on a third electrical signal; coupling the first seed lightwave of which the horizontal polarization and phase are controlled and the split first upward signal light, converting the coupled optical signal into a first electrical signal, coupling the second seed lightwave of which the horizontal polarization and phase are controlled and the split second upward signal light, converting the coupled optical signal into the second electrical signal, feeding back the second electrical signal, coupling the third seed lightwave of which the vertical polarization and phase are controlled and the split third upward signal light, converting the coupled optical signal into the third electrical signal, feeding back the third electrical signal, coupling the fourth seed lightwave of which the vertical polarization and phase are controlled and the split fourth upward signal light, and converting the coupled optical signal into a fourth electrical signal; and detecting an upward signal corresponding to the upward signal light based on the converted first and fourth electrical signals.

In accordance with another embodiment of the present invention, an optical detection apparatus includes: an optical splitting unit configured to split a seed lightwave and split upward signal light generated by an optical network unit based on the seed lightwave; a horizontal polarization controller configured to control horizontal polarization with respect to the split seed lightwaves; a vertical polarization controller configured to control vertical polarization with respect to the split seed lightwaves; a delay unit configured to control a phase of a seed lightwave whose horizontal polarization is controlled and a phase of a seed lightwave whose vertical polarization is controlled; an optical coupling and signal conversion unit configured to couple the seed lightwave of which the horizontal polarization is controlled, the seed lightwave of which the vertical polarization is controlled, the seed lightwave of which the vertical polarization and phase are controlled, and the seed lightwave of which the horizontal polarization and phase are controlled and the split upward signal lights, respectively, and convert the coupled optical signals into electrical signals; and a signal detection unit configured to detect an upward signal corresponding to the upward signal light based on the converted electrical signals.

In accordance with another embodiment of the present invention, an optical detection method includes: splitting a seed lightwave into first and second seed lightwaves by controlling horizontal polarization with respect to the seed lightwave, splitting the seed lightwave into third and fourth seed lightwaves by controlling vertical polarization with respect to the seed lightwave, and splitting upward signal light into first to fourth upward signal lights; delaying a phase of the split second seed lightwave, and delaying a phase of the split fourth seed lightwave; coupling the split first seed lightwave and the split first upward signal light, converting the coupled optical signal into a first electrical signal, coupling the second seed lightwave of which the horizontal polarization and phase are controlled and the split second upward signal light, converting the coupled optical signal into a second electrical signal, coupling the split third seed lightwave and the split third upward signal light, converting the coupled optical signal into a third electrical signal, coupling the fourth seed lightwave of which the vertical polarization and phase are controlled and the split fourth upward signal light, and converting the coupled optical signal into a fourth electrical signal; and detecting an upward signal corresponding to the upward signal light based on the converted first to fourth electrical signals.

In accordance with another embodiment of the present invention, an optical detection apparatus includes: an optical splitting unit configured to split a seed lightwave and split upward signal light generated by an optical network unit based on the seed lightwave; a polarized-beam splitting unit configured to split the split seed lightwaves into seed lightwaves having horizontal polarization and seed lightwaves having vertical polarization, and split the split upward signal lights into upward signal lights having horizontal polarization and upward signal lights having vertical polarization; a delay unit configured to control a phase of a split seed lightwave having horizontal polarization and a phase of a split seed lightwave having vertical polarization; an optical coupling and signal conversion unit configured to couple the split seed lightwave having horizontal polarization and the phase-controlled seed lightwave having horizontal polarization and the split upward signal lights having horizontal polarization, respectively, convert the coupled optical signals into electrical signals, couple the split seed lightwave having vertical polarization the split and the phase-controlled seed lightwave having vertical polarization and the split upward signal lights having vertical polarization, respectively, and convert the coupled optical signals into electrical signals; and a signal detection unit configured to detect an upward signal corresponding to the upward signal light based on the converted electrical signals.

In accordance with another embodiment of the present invention, an optical detection method includes: splitting a seed lightwave into first and second seed lightwaves having horizontal polarization and third and fourth seed lightwaves having vertical polarization, and splitting upward signal light into first and second upward signal lights having horizontal polarization and third and fourth upward signal lights having vertical polarization; delaying a phase of the second seed lightwave having horizontal polarization, and delaying a phase of the fourth seed lightwave having vertical polarization; coupling the first seed lightwave having horizontal polarization and the first upward signal light having horizontal polarization, converting the coupled optical signal into a first electrical signal, coupling the phase-delayed second lightwave having horizontal polarization and the second upward signal light having horizontal polarization, converting the coupled optical signal into a second electrical signal, coupling the third seed lightwave having vertical polarization and the third upward signal light having vertical polarization, converting the coupled optical signal into a third electrical signal, coupling the phase-delayed fourth lightwave having vertical polarization and the fourth upward signal light having vertical polarization, and converting the coupled optical signal into a fourth electrical signal; and detecting an upward signal corresponding to the upward signal light based on the converted first to fourth electrical signals.

In accordance with another embodiment of the present invention, an optical detection apparatus includes: a polarized-beam splitting unit configured to split a seed lightwave, and split upward signal light generated by an optical network unit based on the seed lightwave; an optical coupling and signal conversion unit configured to couple the split seed lightwave and the split upward signal light to the split upward signal light and the split seed lightwave having the same polarization component, respectively, and converting the coupled optical signals into electrical signals; a reflected noise removal unit configured to remove reflected noise from the converted electrical signals; and a signal detection unit configured to detect an upward signal corresponding to the upward signal light based on the electrical signals from which the reflected noise has been removed.

In accordance with another embodiment of the present invention, an optical detection method includes: splitting a seed lightwave, and splitting upward signal light generated by an optical network unit based on the seed lightwave; coupling the split seed lightwave and the split upward signal light to the split upward signal light and the split seed lightwaves having the same polarization component, respectively, and converting the coupled optical signals into electrical signals; removing reflected noise from the converted electrical signals; and detecting an upward signal corresponding to the upward signal light based on the electrical signals from which the reflected noise has been removed.

DESCRIPTION OF SPECIFIC EMBODIMENTS

Figure 1:
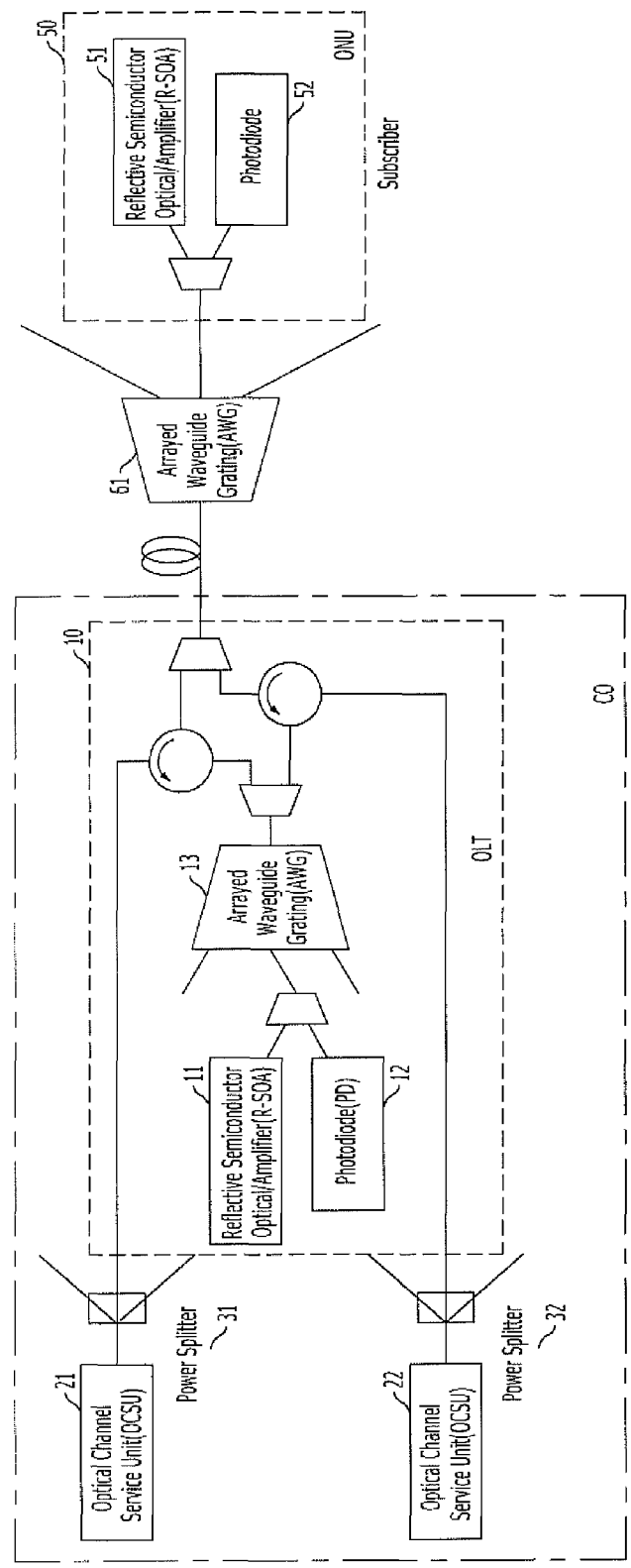
FIG. 1 is a configuration diagram of a WON-PON system based a laser seed lightwave to which the present invention is applied.

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

First, referring to FIGS. 2 to 4 and FIGS. 7 to 14, the technical purport of the present invention will be described.

In exemplary embodiment of the present invention, upward signal light obtained by mixing reference light $E_{Ref} = A_{Ref} \cos(\omega t + \phi_{Ref})$, signal light $$E_S(t) = \sum_i A_{m,i} \cos(\omega_{m,i} t) \cos(\omega t + \phi_S),$$

and reflected light $$E_R(t) = \sum_i A_{R,i} \cos(\omega t + \phi_{R,i})$$

is inputted to a balanced coherent receiver to acquire an output detection current obtained by adding the lights and converting the added light into a current. The output detection current is expressed as Equation 2 below. Here, the upward signal light is modulated by an optical network unit (ONU) so as not to include a DC component. That is, the upward signal light is subjected to a modulation process such that a frequency component of reflected noise is not included.

$$I(t) \approx \left[ \sum_i A_{m,i} \cos(\omega_{m,i} t) \cos(\omega t + \phi_S) + \sum_j A_{R,j} \cos(\omega t + \phi_j) + A_{Ref} \cos(\omega t + \phi_{Ref}) \right]^2 \quad \text{Eq. 2}$$

$$= const + \sum_i A_{m,i}^2 [\cos(\omega_{m,i} t)]^2 + \sum_j A_{R,j}^2 +$$

$$2 \sum_{i,j} A_{R,i} A_{R,j} \cos(\phi_i - \phi_j) + [A_{Ref} \cos(\omega t + \phi_{Ref})]^2 +$$

$$\sum_{i,j} A_{m,j} A_{R,j} \cos(\omega_{m,i} t) \cos(\phi_S - \phi_j) +$$

$$2 \sum_i A_{R,i} A_{Ref} \cos(\phi_i - \phi_{Ref}) +$$

$$\sum_i A_{m,i} A_{Ref} \cos(\omega_{m,i} t) \cos(\phi_S - \phi_{Ref})$$

Furthermore, when the signal light, the reflected light, and the reference light are inputted to the balanced coherent receiver, an output detection current expressed as Equation 3 below may be acquired.

$$I(t) \approx \left[\sum_i A_{m,i}\cos(\omega_{m,i}t)\cos(\omega t + \phi_S) + \sum_j A_{R,j}\cos(\omega t + \phi_j) + A_{Ref}\cos(\omega t + \phi_{Ref})\right]^2 - \quad \text{Eq. 3}$$

$$\left[\sum_i A_{m,i}\cos(\omega_{m,i}t)\cos(\omega t + \phi_S) + \sum_j A_{R,j}\cos(\omega t + \phi_j) + A_{Ref}\cos(\omega t + \phi_{Ref} + \pi)\right]^2$$

$$= 2\sum_i A_{R,j}A_{Ref}\cos(\phi_i - \phi_{Ref}) +$$

$$2\sum_i A_{m,j}A_{Ref}\cos(\omega_{m,i}t)\cos(\phi_S - \phi_{Ref})$$

In Equation 3, since $$\sum_i A_{R,i}A_{Ref}\cos(\phi_i - \phi_{Ref})$$

is a term by the interference between the reflected light and the reference light, $$\sum_i A_{R,i}A_{Ref}\cos(\phi_i - \phi_{Ref})$$

corresponds to a DC component on an RF power spectrum. Since $$\sum_{i,j} A_{m,j}A_{R,j}\cos(\omega_{m,i}t)\cos(\phi_S - \phi_j)$$

is a term by the interference between the signal light and the reference light, a signal may be extracted from $$\sum_i A_{R,i}A_{Ref}\cos(\omega_{m,i}t)(\phi_i - \phi_{Ref}).$$

Furthermore, an electrical filter, for example, a high pass filter (HPF) may be used to separate $$\sum_i A_{R,i}A_{Ref}\cos(\phi_i - \phi_{Ref}) \text{ and } \sum_i A_{R,i}A_{Ref}\cos(\omega_{m,i}t)(\phi_i - \phi_{Ref}).$$

For example, when the phase and polarization of the signal light are matched with those of the reference light, it is possible to detect a signal regardless of the intensity of the reflected light.

In the exemplary embodiments of the present invention, a seed lightwave provided by an optical line terminal (OLT) is injected into a reflective modulator such as R-SOA of an ONU, and the ONU modulates the seed light into upward signal light having no DC component, that is, upward signal light which does not include a frequency component of reflected noise, and transmits the upward signal light to the OLT. Then, the OLT uses part of the seed lightwave as reference light for performing coherent detection, and inputs the reference light and the upward signal light to the balanced coherent receiver to detect an optical current of the seed light having no reflected-light component.

Furthermore, in order to perform the coherent detection, the wavelength, phase, and polarization of the reference light are matched with those of the upward signal light. For example, a WDM-PON system presented by the present invention uses a seed lightwave as the reference light. Accordingly, the wavelength of the reference light automatically coincides with that of the upward signal light. Therefore, in the exemplary embodiments of the present invention, the phase and polarization of the reference light only need to be matched with those of the upward signal light.

Hereafter, the exemplary embodiments of the present invention will be described in detail.

FIG. 1 is a configuration diagram of a WDN-PON system based a laser seed lightwave to which the present invention is applied.

Referring to FIG. 1, the WDM-PON system based on a laser seed lightwave to which the present invention is applied includes an OLT 10, a plurality of optical channel service units (OCSU) 21 and 22, a plurality of power splitters 31 and 32, and a plurality of ONUs 50. The OLT 10, the plurality of OCSUs 21 and 22, and the plurality of power splitters 31 and 32 are provided in a central office (CO) side, and the plurality of ONUs 50 are provided in a subscriber side. The OLT 10 includes a reflective semiconductor optical amplifier (R-SOA) 11, a photodiode 12, and an arrayed waveguide grating (AWG) 13. Each of the ONUs 50 includes an R-SOA 51 and a photodiode 52. Furthermore, outdoor devices on optical lines between the OLT 10 and the respective ONUs 50, which are not illustrated in FIG. 1, include an AWG 61 and so on.

Although the WDM-PON system based on a laser seed lightwave is well-known technology, the respective components of the WDM-PON system will be simply described as follows, such that the present invention which will be described below in detail may be easily understood.

The R-SOAs 11 and 51 are implemented as an optical device capable of amplifying the intensity of input signal light by using a semiconductor, and performs a function of amplifying and modulating an inputted seed lightwave according to an electrical light, converting the amplified and modulated seed lightwave into an optical light including data to be transmitted, and outputting the optical light.

The photodiode 12 includes two electrode elements formed of a semiconductor material which changes incident light into a current, and performs a function of converting an optical signal into an electrical signal.

The AWGs 14 and 61 are provided by implementing a prism function or grating function in a planar waveguide. The prism function or grating function is to separate light in which a variety of wavelengths are mixed, for the respective wavelengths.

The OSCUs 21 and 22 are components for interconnection between an external network (for example, Internet) and an optical communication network. The OSCUs 21 and 22 multiplex a signal received from the external network into an optical signal and provide the multiplexed optical signal to the OLT 10, or demultiplex an optical signal received from the OLT 10 into a signal suitable for the external network and provide the demultiplexed signal to the external network. The signal received from the external network has transmission rates of E1 or 64 to 1,984 Kbit/s.

In the WDN-PON system based on a laser seed lightwave, when the CO provides a laser seed lightwave and the subscriber amplifies and modulates the laser seed lightwave and transmits an upward signal, the CO couples (add) part of the laser seed lightwave and the upward signal from the subscriber, and detects the upward signal light by using an optical detection apparatus.

Referring to FIGS. 2 to 4 and FIGS. 7 to 14, an optical detection apparatus and method in accordance with embodiments of the present invention will be described. A variety of embodiments of the present invention which will be described below are based on a coherent detection scheme.

Figure 2:
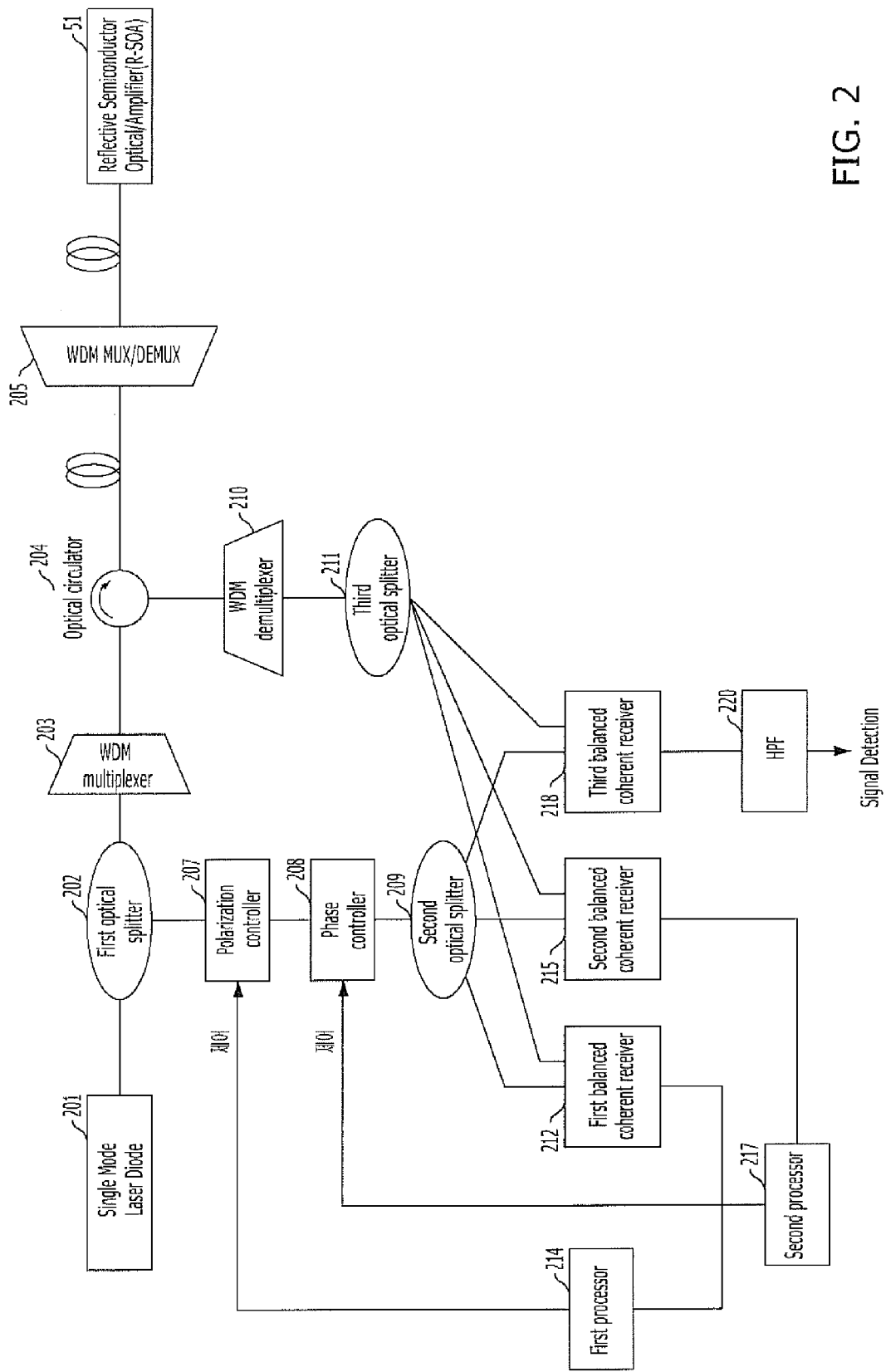
FIG. 2 is a configuration diagram of an optical detection apparatus in accordance with a first embodiment of the present invention.

FIG. 2 is a configuration diagram of an optical detection apparatus in accordance with a first embodiment of the present invention.

Referring to FIG. 2, the optical detection apparatus in accordance with the first embodiment of the present invention is provided in the CO side, and includes a single mode laser diode (SMLD) 201, a first optical splitter 202, a WDM multiplexer 203, an optical circulator 204, a WDM multiplexer/demultiplxer 205, a polarization controller 207, a phase controller 208, a second optical splitter 209, a WDM demultiplxer 210, a third optical splitter 211, a first balanced coherent receiver 212, a first processor 214, a second coherent balanced receiver 215, a second processor 217, a third coherent balanced receiver 21B, and a high pass filter (HPF) 220. Meanwhile, an ONU in the subscriber side includes an R-SOA 51.

The ONU in the subscriber side modulates a seed lightwave provided from the OLT in the CO side into upward signal light having no DC component by using the R-SOA or the like, that is, generates upward signal light which does not include a frequency component of reflected noise, based on the received seed lightwave, and transmits the generated upward signal light to the OLT.

In the first embodiment of the present invention, a transmission path (operation) of the seed lightwave provided by the CO side and a transmission path (operation) of the upward signal light provided by the subscriber side will be described. Referring to this, the optical detection apparatus and method in accordance with the first embodiment of the present invention will be described.

When the SMLD 201 generates a laser seed lightwave and outputs the generated laser seed lightwave to the first optical splitter 202, the first optical splitter 202 splits the laser seed lightwave and injects a part of the split laser seed lightwaves into the R-SOA 51 through the WDM multiplexer 203, the optical circulator 204, the optical line, and the demultiplexer of the WDM multiplexer/demultiplexer 205.

The other part of the laser seed lightwaves split by the first optical splitter 202 is inputted to the second optical splitter 209 through the phase controller 207 and the phase controller 208.

The R-SOA 51 modulates the injected laser seed lightwave into upward signal light having no DC component, that is, generates upward signal light which does not include a frequency component of reflected noise, and outputs the generated upward signal light to the optical line. The upward signal light having no DC component is inputted to the third optical splitter 211 through the multiplexer of the WDM multiplexer/demultiplexer 205, the optical line, the optical circulator 204, and the WDM demultiplexer 210.

Meanwhile, the second optical splitter 209 splits the laser seed lightwave, and inputs the split laser seed lightwaves to the first balanced coherent receiver 212, the second balanced coherent receiver 215, and the third balanced coherent receiver 218, respectively. The third optical splitter 211 splits the upward signal light, and inputs the split upward signal lights to the first balanced coherent receivers 212, the second balanced coherent receiver 215, and the third balanced coherent receiver 218, respectively.

Meanwhile, the second optical splitter 209 may be set in such a manner that the laser seed lightwaves split by the second optical splitter 209, that is, the laser seed lightwaves inputted to the first balanced coherent receiver 212, the second balanced coherent receiver 215, and the third balanced coherent receiver 218, respectively, have the same polarization and phase. Furthermore, the third optical splitter 211 may be set in such a manner that the upward signal lights split by the third optical splitter 211, that is, the upward signal lights inputted to the first balanced coherent receiver 212, the second balanced coherent receiver 215, and the third balanced coherent receiver 218, respectively, have the same polarization and phase.

For this, the first balanced coherent receiver 212 couples the seed lightwave received from the second optical splitter 209 and the upward signal light received from the third optical splitter 211, converts the coupled optical signal into a first electrical signal, and outputs the first electrical signal to the first processor 214.

The first processor 214 sets a polarization control value of the seed lightwave inputted from the first optical splitter 202, based on the first electrical signal transferred from the first balanced coherent receiver 212, and controls the polarization controller 207.

The second balanced coherent receiver 215 couples the seed lightwave received from the second optical splitter 209 and the upward signal light received from the third optical splitter 211, converts the coupled optical signal into a second electrical signal, and outputs the second electrical signal to the second processor 217.

Then, the second processor 217 sets a phase control value of the seed lightwave inputted from the first optical splitter 202, based on the second electrical signal received from the second balanced coherent receiver 215, and controls the phase controller 208.

The third balanced coherent receiver 218 couples the seed lightwave received from the second optical splitter 209 and the upward signal light received from the third optical splitter 211, converts the coupled optical signal into an electrical signal, and outputs the electrical signal to the HPF 220. At this time, the third balanced coherent receiver 218 detects an electrical signal corresponding to the upward signal light.

The HPF 220 removes a DC component of the electrical signal corresponding to the upward signal light received from the third balanced coherent receiver 218, and extracts a final upward signal.

The optical detection apparatus in accordance with the first embodiment of the present invention is implemented to control the polarization and phase of the seed lightwave, based on the idea in which the coherent detection performance may be improved when the polarization and phase of the seed lightwave are equalized to the those of the upward signal light.

That is, the first processor 214 sets the polarization control value corresponding to the seed lightwave such that the current value of the electrical signal converted (detected) by the first balanced coherent receiver 212 has a maximum value, and controls the polarization controller 207 to control the polarization of the seed lightwave inputted from the first optical splitter 217. Furthermore, the second processor 217 sets the phase control value corresponding to the seed lightwave such that the current value of the electrical signal converted (detected) by the second balanced coherent receiver 215 has a maximum value, and controls the phase controller 208 to control the phase of the seed lightwave whose polarization is controlled through the polarization controller 207.

In such a state in which the polarization and phase of the seed lightwave inputted to the second optical splitter 209 are controlled, the laser seed lightwave split by the second optical splitter 209 and the upward signal light split by the third optical splitter 211 are passed through the third balanced coherent receiver 218 and the HPF 220 to detect an upward signal.

Meanwhile, the optical detection method in accordance with the first embodiment of the present invention is performed according to the following processing procedure. First, the seed lightwave generated by the SMLD 201 is split into first to third seed lightwaves, and the upward signal light having no DC component, which is received from the R-SOA 51, that is, the ONU, is split into first to third upward signal lights. Furthermore, the polarization of the seed lightwave is controlled on the basis of a first electrical signal, and the phase of the seed lightwave is controlled on the basis of a second electrical signal. The first seed lightwave of which the polarization and phase are controlled and the split first upward signal light are coupled. Then, the coupled optical signal is converted into a second electrical signal to be fed back. Furthermore, the third seed lightwave of which the polarization and phase are controlled and the split third upward signal light are coupled. Then, the coupled optical signal is converted into an optical signal to detect an upward signal corresponding to the upward signal light. The above-described processing procedure may be easily understood by those skilled in the art through the description of the apparatus. Therefore, the detailed descriptions thereof will be omitted.

The optical detection apparatus and method in accordance with the first embodiment of the present invention may detect an electrical signal corresponding to upward signal light effectively. However, the optimal polarization and phase for optical detection should be traced and controlled in real time. An optical detection apparatus and method capable of solving such a problem in the first embodiment of the present invention will be described with reference to FIG. 3.

Figure 3:
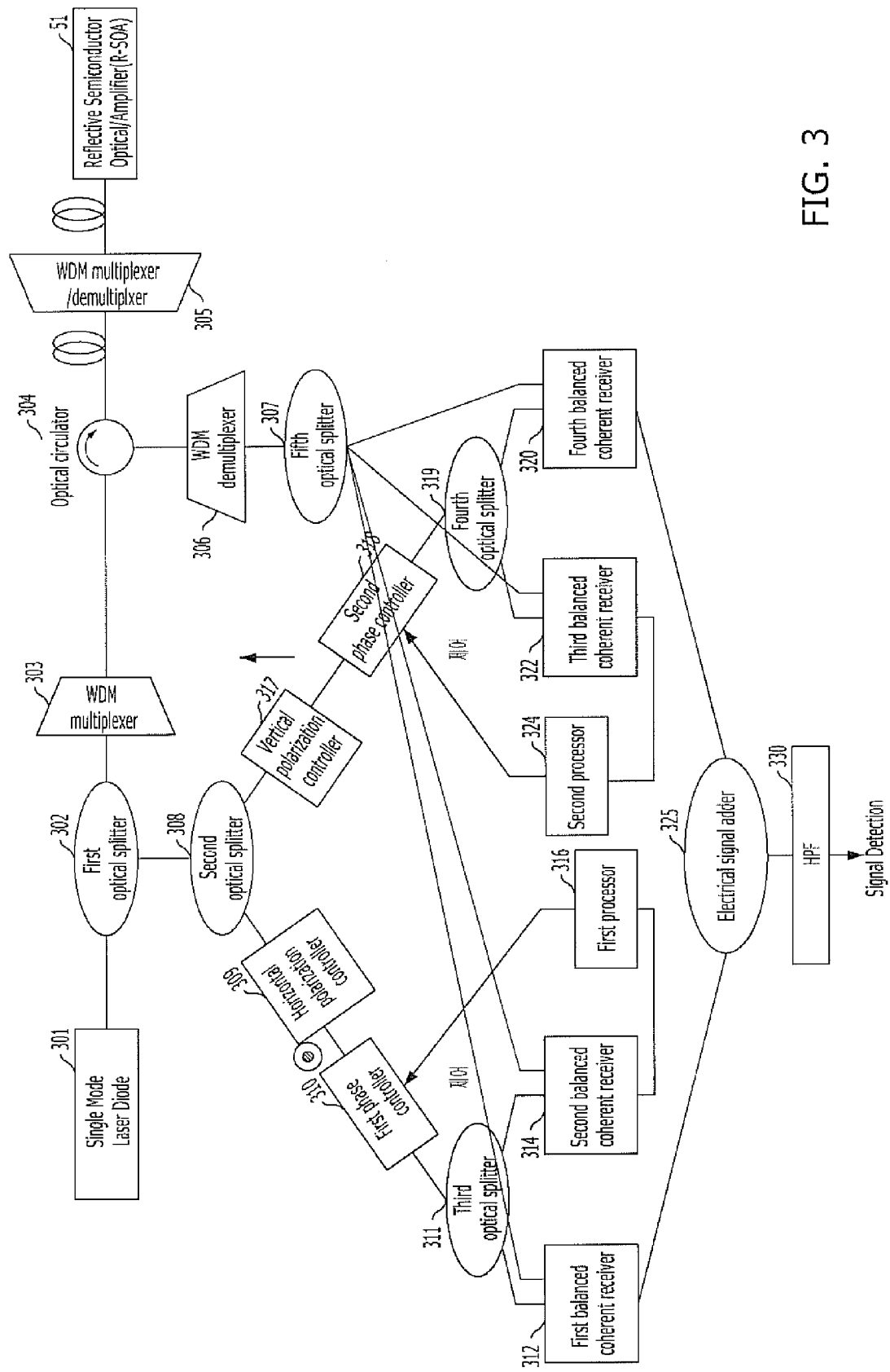
FIG. 3 is a configuration diagram of an optical detection apparatus in accordance with a second embodiment of the present invention.

FIG. 3 is a configuration diagram of an optical detection apparatus in accordance with a second embodiment of the present invention.

Referring to FIG. 3, the optical detection apparatus in accordance with the second embodiment of the present invention is provided in the CO side, and includes an SMLD 301, a first optical splitter 302, a WDM multiplexer 303, an optical circulator 304, a WDM multiplexer/demultiplexer 305, a WDM demultiplexer 306, a fifth optical splitter 307, a second optical splitter 308, a horizontal polarization controller 309, a first phase controller 310, a third optical splitter 311, a first balanced coherent receiver 312, a second balanced coherent receiver 314, a first processor 316, a vertical polarization controller 317, a second phase controller 318, a fourth optical splitter 319, a fourth balanced coherent receiver 32D, a third balanced coherent receiver 322, a second processor 324, an electrical signal (signal current) adder 325, and an HPF 330. Meanwhile, an ONU in the subscriber side includes an R-SOA 51.

The ONU in the subscriber side modulates a seed lightwave received from an OLT in the CO side into upward signal light having no DC component by using the R-SOA or the like, that is, generates upward signal light which does not include a frequency component of reflected noise, based on the received seed lightwave, and transmits the generated upward signal light to the OLT.

Hereafter, a transmission path (operation) of the seed lightwave provided by the CO side and a transmission path (operation) of the upward signal light transmitted by the subscriber side in accordance with the second embodiment of the present invention will be described. Referring to this, the optical detection apparatus and method in accordance with the second embodiment of the present invention will be described as follows.

When the SMLD 301 generates a laser seed lightwave and outputs the generated laser seed lightwave to the first optical splitter 302, the first optical splitter 302 splits the seed lightwave, and injects a part of the split seed lightwaves to the R-SOA 51 through the WDM multiplexer 303, the optical circulator 304, an optical line, and a demultiplexer of the WDM multiplexer/demultiplexer 305.

Meanwhile, the R-SOA 51 modulates the injected seed lightwave into upward signal light having no DC component, that is, generates upward signal light which does not include a frequency component of reflected noise, and outputs the generated upward signal light to the optical line. Through the optical line, the upward signal light having no DC component is inputted to the fifth optical splitter 307 through a multiplexer of the WDM multiplexer/demultiplexer 305, the optical line, the optical circulator 304, and the WDM demultiplexer 306.

Meanwhile, the other part of the seed lightwaves split by the first optical splitter 302 is inputted to the second optical splitter 308.

The inputted seed lightwave is split by the second optical splitter 308, and inputted to the horizontal polarization controller 309 and the vertical polarization controller 317, respectively.

Then, the horizontal polarization controller 309 controls horizontal polarization with respect to the seed lightwave received from the second optical splitter 308, and outputs the seed lightwave having horizontal polarization "⊙" to the third optical splitter 311 through the first phase controller 310. Meanwhile, the vertical polarization controller 317 controls vertical polarization with respect to the seed lightwave received from the second optical splitter 308 and outputs the seed lightwave having vertical polarization "↑" to the fourth optical splitter 319 through the second phase controller 318.

The seed lightwave having horizontal polarization "⊙" is split by the third optical splitter 311, and inputted to the first balanced coherent receiver 312 and the second balanced coherent receiver 314. The upward signal light having no DC component is split by the fifth optical splitter 307 and inputted to the first balanced coherent receiver 312, the second balanced coherent receiver 314, the third balanced coherent receiver 322, and the fourth balanced coherent receiver 320.

The seed lightwave having vertical polarization "↑" is split by the fourth optical splitter 319 and inputted to the third balanced coherent receiver 314 and the fourth balanced coherent receiver 320.

Meanwhile, the third optical splitter 311 is set in such a manner that the seed lightwaves having horizontal polarization "⊙", which are split by the third optical splitter 311, that is, the respective seed lightwaves having horizontal polarization "⊙", which are inputted to the first balanced coherent receiver 312 and the second balanced coherent receiver 314, have the same polarization and phase. Furthermore, the fourth optical splitter 319 is set in such a manner that the seed lightwaves having vertical polarization "↑", which are split by the fourth optical splitter 319, that is, the respective seed lightwaves having vertical polarization "↑", which are inputted to the third balanced coherent receiver 322 and the fourth balanced coherent receiver 320, have the same polarization and phase. Furthermore, the fifth optical splitter 307 may be set in such a manner that the upward signal lights having no DC component, which are split by the fifth optical splitter 307, that is, the respective upward signal lights inputted to the first balanced coherent receiver 312, the second balanced coherent receiver 314, the third balanced coherent receiver 322, and the fourth balanced coherent receiver 320 have the same polarization and phase.

For this, the second balanced coherent receiver 314 couples the seed lightwave having horizontal polarization "⊙" and received from the third optical splitter 311 and the upward signal light received from the fifth optical splitter 307. Then, the second balanced coherent receiver 314 converts the coupled optical signal related to the horizontal polarization "⊙" into a second electrical signal, and outputs the second electrical signal to the first processor 316.

The first processor 316 sets a phase control value of the seed lightwave having horizontal polarization "⊙" and inputted from the horizontal polarization controller 309 based on the second electrical signal received from the second balanced coherent receiver 314, and controls the first phase controller 310.

The third balanced coherent receiver 322 couples the seed lightwave having vertical polarization "↑" and received from the fourth optical splitter 319 and the upward signal light received from the fifth optical splitter 307. Then, the third balanced coherent receiver 322 converts the coupled optical signal related to the vertical polarization "↑" into a third electrical signal, and outputs the third electrical signal to the second processor 324.

The second processor 324 sets a phase control value of the seed lightwave having vertical polarization "↑" and inputted from the vertical polarization controller 317 based on the third electrical signal received from the third balanced coherent receiver 322, and controls the second phase controller 318.

Meanwhile, the first balanced coherent receiver 312 couples the seed lightwave having horizontal polarization "⊙" and received from the third optical splitter 311 and the upward signal light received from the fifth optical splitter 307, converts the coupled optical signal related to the horizontal polarization "⊙" into a first electrical signal, and outputs the first electrical signal to the electrical signal adder 325.

The fourth balanced coherent receiver 320 couples the seed lightwave having vertical polarization "↑" and received from the fourth optical splitter 319 and the upward signal light received from the fifth optical splitter 307, converts the coupled optical signal related to the vertical polarization "↑" into a fourth electrical signal, and outputs the fourth electrical signal to the electrical signal adder 325.

The optical detection apparatus in accordance with the second embodiment of the present invention is implemented so as to perform the phase control on the seed lightwave having horizontal polarization "⊙" and the seed lightwave having vertical polarization "↑", respectively, after the seed lightwave and the upward signal light arrive at the optical detection apparatus, without performing the polarization control in real time.

That is, the first processor 316 sets the corresponding phase control value related to the seed lightwave having horizontal polarization "⊙" such that the current value of the second electrical signal converted (detected) by the second balanced coherent receiver 314 has a maximum value, and controls the first phase controller 310 to control the phase of the seed lightwave having horizontal polarization "⊙" and having passed through the horizontal polarization controller 309. The second processor 324 sets the corresponding phase control value related to the seed lightwave having vertical polarization "↑" such that the current value of the third electrical signal converted (detected) by the third balanced coherent receiver 322 has a maximum value, and controls the second phase controller 318 to control the phase of the seed lightwave having vertical polarization "↑" and having passed through the vertical polarization controller 317.

In such a state in which the phase of the seed lightwave having horizontal polarization "⊙" and inputted to the third optical splitter 311 and the phase of the seed lightwave having vertical polarization "↑" and inputted to the fourth optical splitter 319 are controlled, the first electrical signal converted by the first balanced coherent receiver 312 and related to horizontal polarization "⊙" and the fourth electrical signal converted by the fourth balanced coherent receiver 320 and related to vertical polarization "↑" are added by the electrical signal (signal current) adder 325, and then outputted to the HPF 330. At this time, the electrical signal adder 325 detects an electrical signal corresponding to the upward signal light.

The HPF 330 removes a DC component of the electrical signal corresponding to the upward signal light, which is received from the electrical signal adder 325, and extracts a final upward signal. As such, the current value of the electrical signal detected through the electrical signal adder 325 and HPF 330 is used as a current value of the upward signal.

The optical detection method in accordance with the second embodiment of the present invention is performed according to the following processing procedure. First, a seed lightwave generated by the SMLD 301 is split. Some of the split seed lightwaves are split into first and second seed lightwaves by controlling the horizontal polarization of the split seed lightwaves. Some other of the split seed lightwaves are split into third and fourth seed lightwaves by controlling the vertical polarization of the split seed lightwaves. Furthermore, upward signal light having no DC component and received from the R-SOA 51, that is, the ONU is split into first to fourth upward signal lights. The phases of the first and second seed lightwaves whose horizontal polarization has been controlled are controlled on the basis of a second electrical signal, and the phases of the third and fourth seed lightwaves whose vertical polarization has been controlled are controlled on the basis of a third electrical signal. The first seed lightwave of which the horizontal polarization and phase have been controlled and the split first upward signal light are coupled, and the coupled optical signal is converted into a first electrical signal. The second seed lightwave of which the vertical polarization and phase have been controlled and the split second upward signal light are coupled, and the coupled optical signal is converted into a second electrical signal to be fed back. Furthermore, the third seed lightwave of which the vertical polarization and phase have been controlled and the divided third upward signal light are coupled, and the coupled optical signal is converted into a third electrical signal to be fed back. The fourth seed lightwave of which the vertical polarization and phase have been controlled and the split fourth upward signal light are coupled, and the coupled optical signal is converted into a fourth electrical signal. Based on the converted first and fourth electrical signals, an upward signal corresponding to the upward signal light is detected. The processing procedure may be easily understood by those skilled in the art through the above descriptions of the optical detection apparatus. Therefore, the detailed descriptions of the procedure will be omitted.

Figure 4:
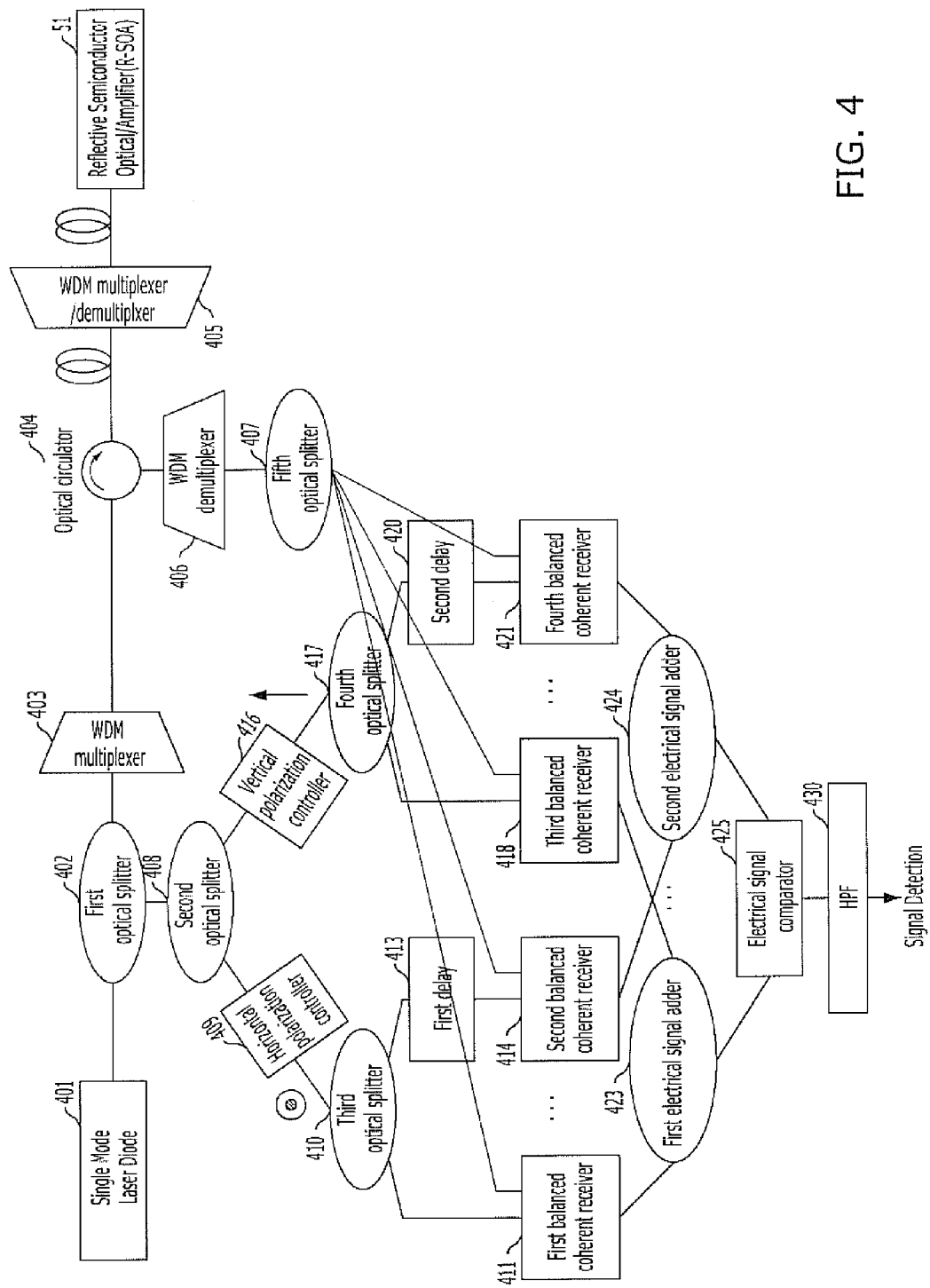
FIG. 4 is a configuration diagram of an optical detection apparatus in accordance with a third embodiment of the present invention.
Figure 5:
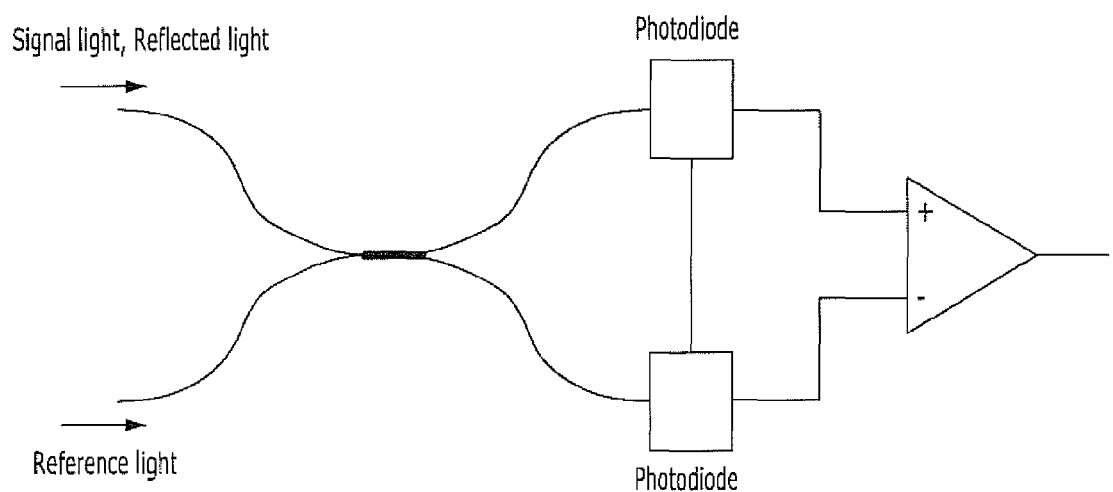
FIG. 5 is a diagram explaining an example of a general balanced coherent receiver.
Figure 6:
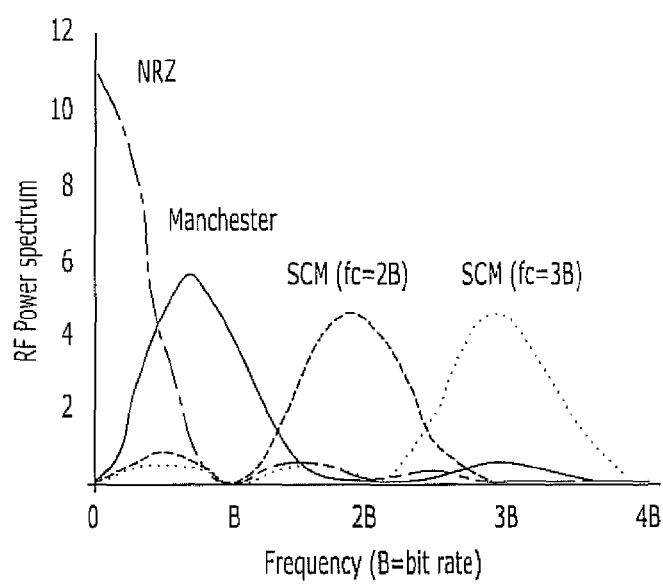
FIG. 6 is a diagram explaining an RF power spectrum according to a general modulation scheme.

The optical detection apparatus and method in accordance with the second embodiment of the present invention performs the coherent detection by tracing only the phase for optical detection in real time. Referring to FIG. 4, an optical detection apparatus in accordance with a third embodiment of the present invention, which performs optical detection without tracing the polarization and phase of upward signal light, will be described.

FIG. 4 is a configuration diagram of an optical detection apparatus in accordance with the third embodiment of the present invention.

Referring to FIG. 4, the optical detection apparatus in accordance with the third embodiment of the present invention is provided in the CO side, and includes an SMLD 401, a first optical splitter 402, an optical circulator 404, a WDM multiplexer/demultiplexer 405, a WDM demultiplexer 406, a fifth optical splitter 407, a second optical splitter 408, a horizontal polarization controller 409, a third optical splitter 410, a first balanced coherent receiver 411, a first delay (passive phase controller) 413, a second balanced coherent receiver 414, a vertical polarization controller 416, a fourth optical splitter 417, a third balanced coherent receiver BR3, a second delay 420, a fourth balanced coherent receiver 421, a first electrical signal (signal current) adder 423, a second electrical signal adder 424, an electrical signal comparator 425, and an HPF 430. Meanwhile, an ONU in the subscriber side includes an R-SOA 51.

The ONU in the subscriber side modulates a seed lightwave received from an OLT in the CO side into upward signal light having no DC component by using the R-SOA or the like, that is, generates upward signal light which does not include a frequency component of reflected noise, based on the received seed lightwave, and transmits the generated upward signal light to the OLT.

Hereafter, a transmission path (operation) of the seed lightwave provided by the CO side and a transmission path (operation) of the upward signal light transmitted by the subscriber side will be described. Referring to this, the optical detection apparatus and method in accordance with the third embodiment of the present invention will be described as follows.

When the SMLD 401 generates a laser seed lightwave and outputs the generated laser seed lightwave to the first optical splitter 402, the first optical splitter 402 splits the seed lightwave, and injects a part of the split seed lightwaves into the R-SOA 51 through the WDM multiplexer 403, the optical circulator 404, the optical line, and a demultiplexer of the WDM multiplexer/demultiplexer 405.

The R-SOA 51 modulates the injected seed lightwave into upward signal light having no DC component, that is, generates upward signal light which does not include a frequency component of reflected noise, and outputs the generated upward signal light to the optical line. The upward signal light having no DC component is inputted to the fifth optical splitter 407 through a multiplexer of the WDM multiplexer/demultiplexer 405, the optical line, the optical circulator 404, and the WDM demultiplexer 406.

Meanwhile, the other part of the seed lightwaves split by the first optical splitter 402 is inputted to the second optical splitter 408.

The seed lightwave inputted to the second optical splitter 408 is split by the second optical splitter 408 and then inputted to the horizontal polarization controller 409 and the vertical polarization controller 416.

The horizontal polarization controller 409 controls the horizontal polarization of the seed lightwave received from the second optical splitter 408, and outputs the seed lightwave having horizontal polarization "⊙" to the third optical splitter 410.

The seed lightwave having horizontal polarization "⊙" is split by the third optical splitter 410, and inputted to the first balanced coherent receiver 411 and the first delay 413. Then, the first delay 413 delays the phase of the seed lightwave having horizontal polarization "⊙" and received from the third optical splitter 410, and outputs the seed lightwave having horizontal polarization "⊙", of which the phase is different from the seed lightwave having horizontal polarization "⊙" and inputted to the first balanced coherent receiver 411, to the second balanced coherent receiver 414.

The vertical polarization controller 416 controls the vertical polarization of the seed lightwave received from the second optical splitter 408, and outputs the seed lightwave having vertical polarization "↑" to the fourth optical splitter 417.

The seed lightwave having vertical polarization "↑" is split by the fourth optical splitter 417, and inputted to the third balanced coherent receiver 418 and the second delay 420. Then, the second delay 420 delays the phase of the seed lightwave having vertical polarization "↑" and received from the fourth optical splitter 417, and outputs the seed lightwave having vertical polarization "↑", of which the phase is different from the seed lightwave having vertical polarization "↑" and inputted to the third balanced coherent receiver 418, to the fourth balanced coherent receiver 421.

Meanwhile, the upward signal light having no DC component is split by the fifth optical splitter 407, and inputted to the first balanced coherent receiver 411, the second balanced coherent receiver 414, the third balanced coherent receiver 418, and the fourth balanced coherent receiver 421. The fifth optical splitter 407 may be set in such a manner that the upward signal lights having no DC component and split by the fifth optical splitter 407, that is, the upward signal lights inputted to the first balanced coherent receiver 411, the second balanced coherent receiver 414, the third balanced coherent receiver 418, respectively, have the same polarization and phase.

Meanwhile, the first balanced coherent receiver 411 couples the seed lightwave having horizontal polarization "⊙" and received from the third optical splitter 410 and the upward signal light received from the fifth optical splitter 407, converts the coupled optical signal related to horizontal polarization "⊙" into a first electrical signal, and outputs the first electrical signal to the first electrical signal adder 423.

The third balanced coherent receiver 418 couples the seed lightwave having vertical polarization "↑" and received from the fourth optical splitter 417 and the upward signal light received from the fifth optical splitter 407, converts the coupled optical signal related to vertical polarization "↑" into a third electrical signal, and outputs the third electrical signal to the first electrical signal adder 423.

Then, the first electrical signal adder 423 adds the first electrical signal received from the first balanced coherent receiver 411 and the third electrical signal received from the third balanced coherent receiver 418, and outputs the added electrical signal to the electrical signal comparator 425.

Meanwhile, the second balanced coherent receiver 414 couples the seed lightwave having horizontal polarization "⊙" and a delayed phase, which is received from the first delay 413, and the upward signal light received from the fifth optical splitter 407, converts the coupled optical signal related to the horizontal polarization "⊙" and the delayed phase into a second electrical signal, and outputs the second electrical signal to the second electrical signal adder 424.

The fourth balanced coherent receiver 421 couples the seed lightwave having vertical polarization "↑" and a delayed phase, which is received from the second delay 420, and the upward signal received from the fifth optical splitter 407, converts the coupled optical signal related to the vertical polarization "↑" and the delayed phase into a fourth electrical signal, and outputs the fourth electrical signal to the second electrical signal adder 424.

Then, the second electrical signal adder 424 adds the second electrical signal received from the second balanced coherent receiver 414 and the fourth electrical signal received from the fourth balanced coherent receiver 421, and outputs the added electrical signal to the electrical signal comparator 425.

The electrical signal comparator 425 selects an electrical signal having a maximum current value between the electrical signals received from the first and second electrical signal adders 423 and 424, and outputs the selected electrical signal to the HPF 430. At this time, the electrical signal comparator 425 detects an electrical signal corresponding to the upward signal light.

The HPF 430 removes a DC component of the electrical signal corresponding to the upward signal light and received from the electrical signal comparator 425, and extracts a final upward signal. As such, the current value of the electrical signal detected through the electrical signal comparator 425 and the HPF 430 is used as the current value of the upward signal.

The optical detection apparatus in accordance with the third embodiment of the present invention compares the current values of the electrical signals detected by the plurality of seed lightwaves having different phases, removes the DC component, and detects the electrical signal (signal current) having a maximum current value as the electrical signal corresponding to the upward signal light. The electrical signals detected by the plurality of seed lightwaves having different phases include the electrical signal obtained when the first and third balanced coherent receivers 411 and 418 detect and add the electrical signals for the seed lightwave having horizontal polarization "⊙" and the seed lightwave having vertical polarization "↑", which are perpendicular to each other but have the same phase, and the electrical signal obtained when the second and fourth balanced coherent receivers 414 and 421 detect and add the electrical signals for the seed lightwave having horizontal polarization "⊙" and the seed lightwave having vertical polarization "↑", which are perpendicular to each other but have the same phase.

Meanwhile, the optical detection method in accordance with the third embodiment of the present invention is performed according to the following processing procedure. First, the SMLD 401 generates a laser seed lightwave, and the generated laser seed lightwave is split. Horizontal polarization for a part of the split seed lightwaves is controlled to output a seed lightwave having horizontal polarization, and vertical polarization for the other part of the split seed lightwaves is controlled to output a seed lightwave having vertical polarization. The seed lightwave having the horizontal polarization and split upward signal light having no DC component, which is received from the R-SOA 51, that is, the ONU, are coupled, and the coupled optical signal is converted into a first electrical signal. The seed lightwave having the vertical polarization and split upward signal light having no DC component, which is received from the R-SOA 51, that is, the ONU, are coupled, and the coupled optical signal is converted into a third electrical signal. Furthermore, the phase of the seed lightwave having the horizontal polarization is delayed, and the phase of the seed lightwave having the vertical polarization is delayed. The seed lightwave having horizontal polarization and a delayed phase and split upward signal light having no DC component, which is received from the ONU, are coupled, and the coupled optical signal is converted into a second electrical signal. The seed lightwave having vertical polarization and a delayed phase and split upward signal light having no DC component, which is received from the ONU, are coupled, and the coupled optical signal is converted into a fourth electrical signal. Based on the converted first to fourth electrical signals, an electrical signal corresponding to the upward signal light is detected, and a DC component of the electrical signal is removed to detect a final upward signal. The above-described process may be easily understood by those skilled in the art through the description of the apparatus. Therefore, the detailed descriptions thereof will be omitted.

Figure 7:
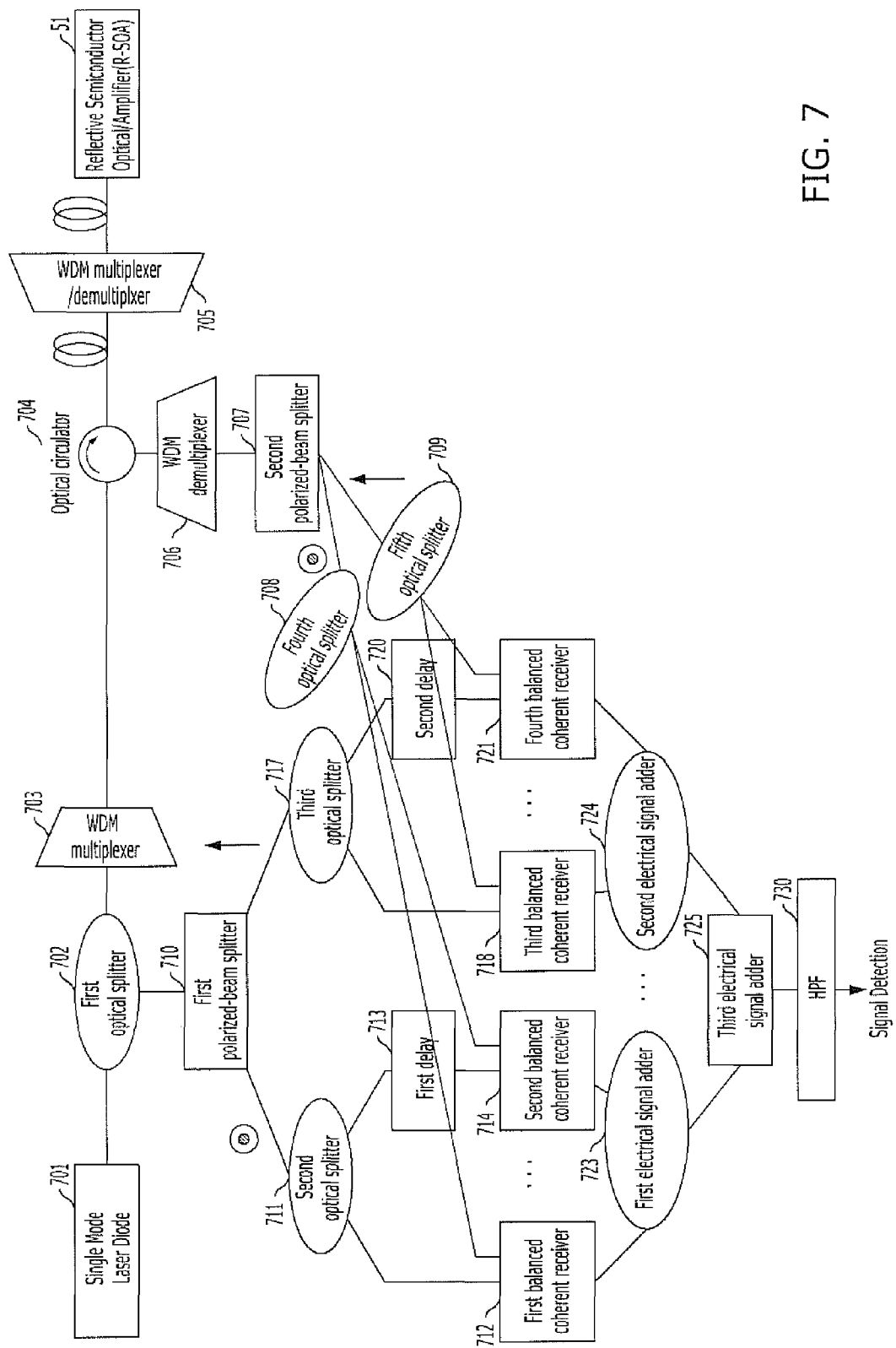
FIG. 7 is a configuration of an optical detection apparatus in accordance with a modification of the third embodiment of the present invention.

FIG. 7 is a configuration of an optical detection apparatus in accordance with a modification of the third embodiment of the present invention.

Referring to FIG. 7, the optical detection apparatus in accordance with the modification of the third embodiment of the present invention is provided in the CO side, and includes an SMLD 701, a first optical splitter 702, a WDM multiplexer 703, an optical circulator 704, a WDM multiplexer/demultiplexer 705, a WDM demultiplexer 706, a second polarized-beam splitter 707, a fourth optical splitter 708, a fifth optical splitter 709, a first polarized-beam splitter 710, a second optical splitter 711, a first balanced coherent receiver 712, a first delay (passive phase controller) 713, a second balanced coherent receiver 714, a third optical splitter 717, a third balanced coherent receiver 718, a second delay 720, a fourth balanced coherent receiver 721, a first electrical signal (signal current) adder 723, a second electrical signal adder 724, a third electrical signal adder 725, and an HPF 730. Meanwhile, an ONU in the subscriber side includes an R-SOA 51.

The ONU in the subscriber side modulates a seed lightwave received from an OLT in the CO side into upward signal light having no DC component by using the R-SOA or the like, that is, generates upward signal light which does not include a frequency component of reflected noise, based on the received seed lightwave, and transmits the upward signal light to the OLT.

Hereafter, a transmission path (operation) of the seed lightwave provided by the CO side and a transmission path (operation) of the upward signal light transmitted by the subscriber side in accordance with the modification of the third embodiment of the present invention will be described. Referring to this, the optical detection apparatus and method in accordance with the modification of the embodiment of the present invention will be described as follows.

When the SMLD 701 generates a laser seed lightwave and outputs the generated laser seed lightwave to the first optical splitter 702, the first optical splitter 702 splits the seed lightwave and inject a part of the split seed lightwaves into the R-SOA 51 through the WDM multiplexer 703, the optical circulator 704, an optical line, and a demultiplexer of the WDM multiplexer/demultiplexer 705.

The R-SOA 51 modulates the injected seed lightwave into upward signal light having no DC component, that is, generates upward signal light which does not include a frequency component of reflected noise, and outputs the generated upward signal light to the optical line. The upward signal light having no DC component, that is, the upward signal light which does not include a frequency component of reflected noise is inputted to the second polarized-beam splitter 707 through a multiplexer of the WDM multiplexer/demultiplexer 705, the optical line, the optical circulator 704, and the WDM demultiplexer 706.

Meanwhile, the other part of the seed lightwaves split by the first optical splitter 702 is inputted to the first polarized-beam splitter 710.

The first polarized-beam splitter 710 splits the seed lightwave received from the splitter 702 into a seed lightwave having horizontal polarization "⊙" and a seed lightwave having vertical polarization "↑". Then, the first polarized-beam splitter 710 outputs the seed lightwave having horizontal polarization "⊙" to the second optical splitter 711, and outputs the seed lightwave having vertical polarization "↑" to the third optical splitter 717.

The second optical splitter 711 splits the seed lightwave having horizontal polarization "⊙" and inputs the split seed lightwaves to the first balanced coherent receiver 712 and the first delay 713, respectively. Then, the first delay 713 delays the phase of the seed lightwave having horizontal polarization "⊙" and received from the second optical splitter 711, and outputs the seed lightwave having horizontal polarization "⊙", of which the phase is different from that of the seed lightwave having horizontal polarization "⊙" and inputted to the first balanced coherent receiver 712, to the second balanced coherent receiver 714.

The third optical splitter 717 splits the seed lightwave having vertical polarization "↑", and inputs the split seed lightwaves to the third balanced coherent receiver 718 and the second delay 720, respectively. Then, the second delay 720 delays the phase of the seed lightwave having vertical polarization "↑" and received from the third optical splitter 717, and outputs the seed lightwave having vertical polarization "↑", of which the phase is different from that of the seed lightwave having vertical polarization "↑" and inputted to the third balanced coherent receiver 718, to the fourth balanced coherent receiver 721.

Meanwhile, the upward signal light having no DC component, that is, the upward signal light which does not include a frequency component of reflected noise is split into upward signal light having horizontal polarization "⊙" and upward signal light having vertical polarization "↑" by the second polarized-beam splitter 707. The upward signal light having horizontal polarization "⊙" is inputted to the fourth optical splitter 708, and the upward signal light having vertical polarization "↑" is inputted to the fifth optical splitter 709.

The upward signal light having horizontal polarization "⊙" is split by the fourth optical splitter 708, and inputted to the first balanced coherent receiver 712 and the second balanced coherent receiver 714. The upward signal light having vertical polarization "↑" is split by the fifth optical splitter 709, and inputted to the third balanced coherent receiver 718 and the fourth balanced coherent receiver 721. Accordingly, the seed lightwaves and the upward signal lights, which are inputted to the respective balanced coherent receivers 712, 714, 718, and 721, have the same polarization.

The first balanced coherent receiver 712 couples the seed lightwave having horizontal polarization "⊙" and received from the second optical splitter 711 and the upward signal light having horizontal polarization "⊙" and received from the fourth optical splitter 708, converts the coupled optical signal related to the horizontal polarization "⊙" into a first electrical signal, and outputs the first electrical signal to a first electrical signal adder 723.

The second balanced coherent receiver 714 couples the seed lightwave having horizontal polarization "⊙" and a delayed phase, which is received from the first delay 713, and the upward signal light having horizontal polarization "⊙" and received from the fourth optical splitter 708, converts the coupled optical signal related to the horizontal polarization "⊙" and the delayed phase into a second electrical signal, and outputs the second electrical signal to the first electrical signal adder 723.

The first electrical signal adder 723 adds the first electrical signal received from the first balanced coherent receiver 712 and the second electrical signal received from the second balanced coherent receiver 714, and outputs the added electrical signal to the third electrical signal adder 725.

The third balanced coherent receiver 718 couples the seed lightwave having vertical polarization "↑" and received from the third balanced coherent receiver 717 and the upward signal light having vertical polarization "↑" and received from the fifth optical splitter 709, converts the coupled optical signal related to the vertical polarization "↑" into a third electrical signal, and outputs the third electrical signal to the second electrical signal adder 724.

The fourth balanced coherent receiver 721 couples the seed lightwave having vertical polarization "↑" and a delayed phase, which is received from the second delay 720, and the upward signal light having vertical polarization "↑" and received from the fifth optical splitter 709, converts the coupled optical signal related to the vertical polarization "↑" and the delayed phase into a fourth electrical signal, and outputs the fourth electrical signal to the second electrical signal adder 724.

The second electrical signal adder 724 adds the third electrical signal received from the balanced coherent receiver 718 and the fourth electrical signal received from the fourth balanced coherent receiver 721, and outputs the added electrical signal to the third electrical signal adder 725.

Then, the third electrical signal adder 725 may extract an upward signal having no relation to the phase and polarization of an optical signal, by using the electrical signals received from the first and second electrical adders 723 and 724. Furthermore, it is possible to acquire an upward signal having no noise by passing the upward signal through the HPF 730 configured to remove a DC component, that is, a frequency component of reflected noise from the upward signal.

Meanwhile, the optical detection method in accordance with the modification of the third embodiment of the present invention is performed according to the following processing procedure. First, the SMLD 701 generates a laser seed lightwave, and the laser seed lightwave is split into first and second seed lightwave having horizontal polarization and third and fourth seed lightwave having vertical polarization. Furthermore, upward signal light having no DC component and received from the R-SOA 51, that is, the ONU is split into first and second upward signal lights having horizontal polarization and third and fourth upward signal lights having vertical polarization. The phase of the second seed lightwave having vertical polarization is delayed, and the phase of the fourth seed lightwave having horizontal polarization is delayed. The first seed lightwave having horizontal polarization and the first upward signal light having horizontal polarization are coupled, and the coupled optical signal is converted into a first electrical signal. The second seed lightwave having horizontal polarization, of which the phase has been delayed, and the second upward signal light having horizontal polarization are coupled, and the coupled optical signal is converted into a second electrical signal. The third seed lightwave having vertical polarization and the third upward signal light having vertical polarization are coupled, and the coupled optical signal is converted into a third electrical signal. The fourth seed lightwave having vertical polarization, of which the phase has been delayed, and the fourth upward signal light having vertical polarization are coupled, and the coupled optical signal is converted into a fourth electrical signal. Based on the converted first to fourth electrical signal, an upward signal corresponding to the upward signal light is detected. The above-described process may be easily understood by those skilled in the art through the description of the apparatus. Therefore, the detailed descriptions thereof will be omitted.

Meanwhile, there are a variety of methods capable of acquiring an upward signal regardless of the phase of the upward signal light. One of the methods will be described as follows.

Figure 8:
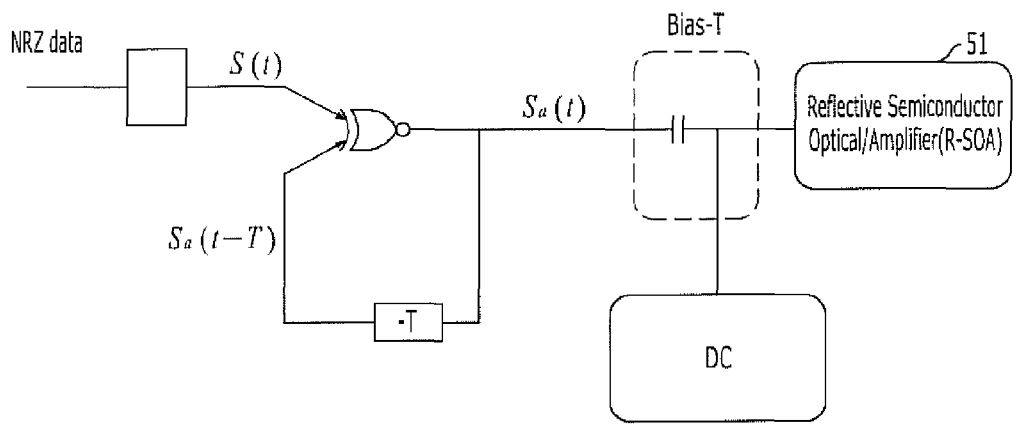
FIG. 8 is a diagram explaining a modulation process in an R-SOA used in the present invention.

When the R-SOA 51 of FIG. 7 modulates a seed lightwave into upward signal light having no DC component, that is, upward signal light which does not include a frequency component of reflected noise, a process of FIG. 8 is performed. That is, when an NRZ signal, that is, NRZ data is to be transmitted, an exclusive NOR gate having a truth table described in FIG. 8 is used. A signal S(t) to be transmitted and a signal $S_d(t-T)$ obtained by delaying an output of the exclusive NOR gate XNOR by one bit are inputted to the exclusive NOR gate XOR. Then, the R-SOA 51 modulates a seed lightwave into upward signal light having no DC component, that is, upward signal light which does not include a frequency component of reflected noise, by using an output $S_D(t)$ of the exclusive NOR gate XNOR.

In this case, between the signal to be transmitted and the modulated signal, a relation expressed as Equation 4 below is established.

$$S_d(t)=S(t)\oplus S_d(t-T) \qquad \text{Eq. 4}$$

Figure 9:
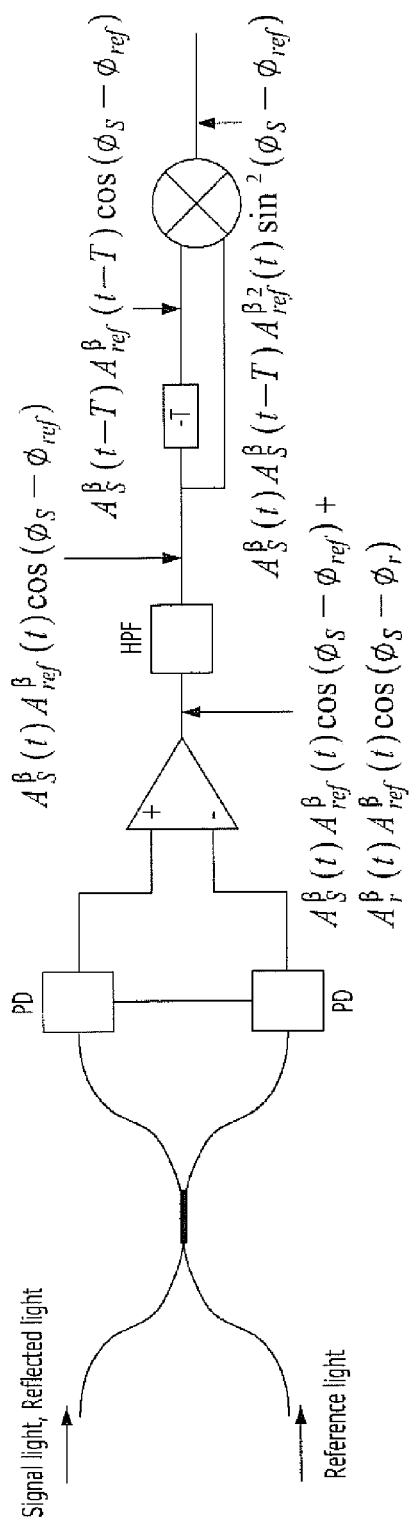
FIGS. 9 and 10 are diagram explaining examples of balanced coherent receivers which are used in the present invention.
Figure 9:
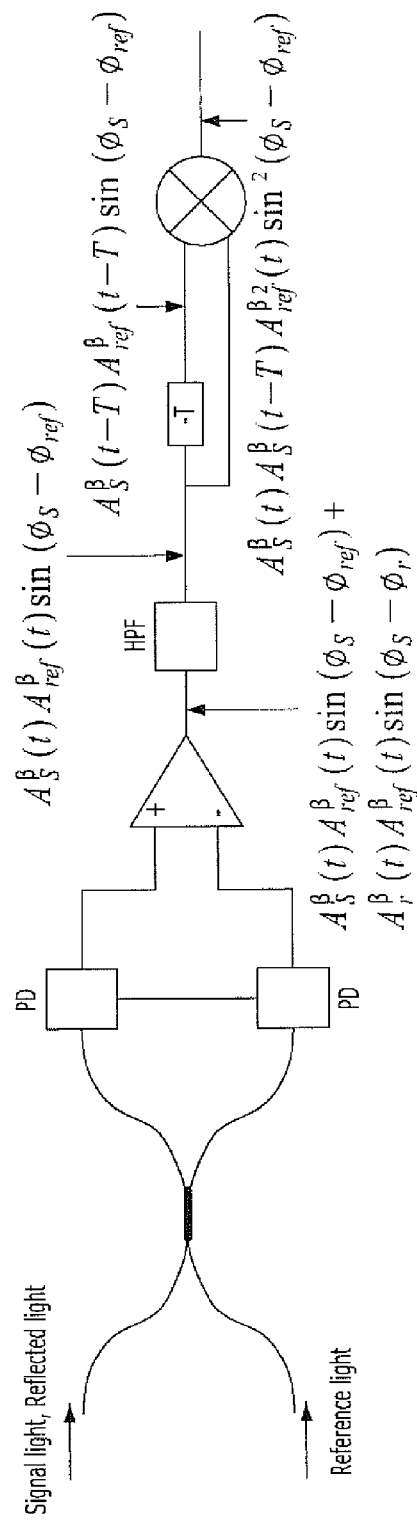
Figure 10:
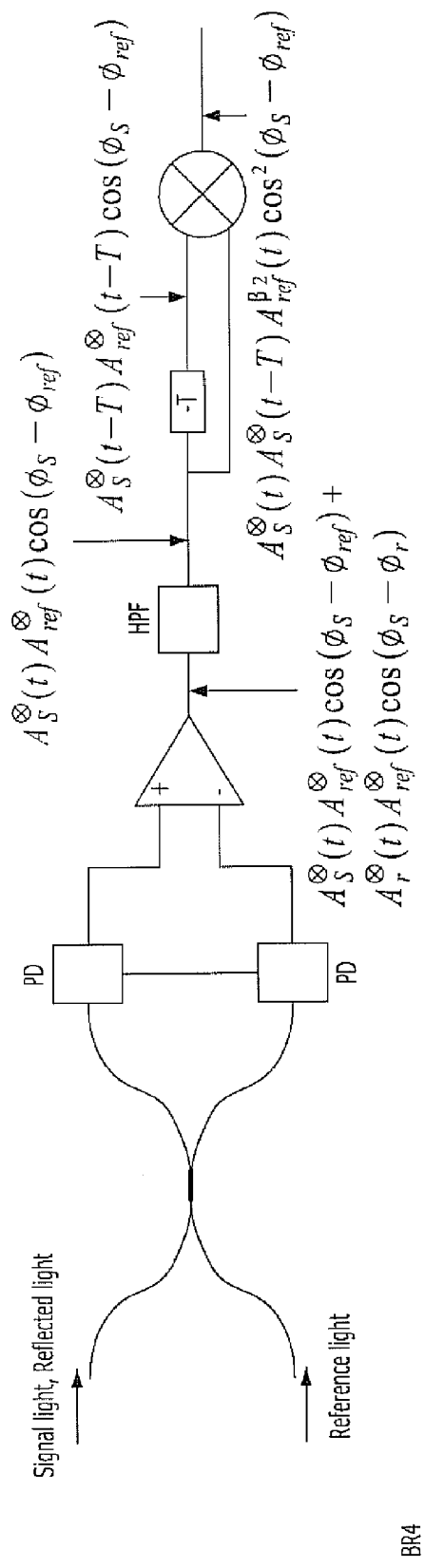
Figure 10:
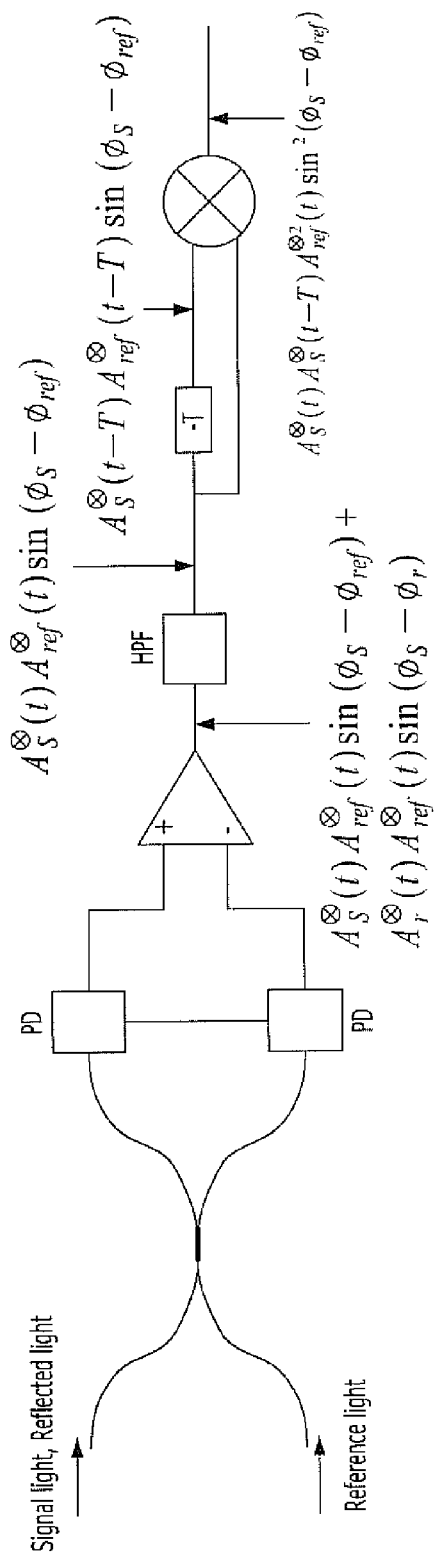

Meanwhile, the first balanced coherent receiver 712, the second balanced coherent receiver 714, the third balanced coherent receiver 718, and the fourth balanced coherent receiver 721 of FIG. 7 may be implemented as shown in FIGS. 9 and 10.

At this time, optical signals including received upward signal light $E_R(t)$, reflected noise light (reflected light) $E_R(t)$, reference light $E_{Ref}(t)$ may be expressed as Equation 5 below.

$$E_S(t)=A_S(t)\exp[-i(\omega t+\phi_s)]$$

$$E_R(t)=A_{R,i}(t)\exp[-i(\omega t+\phi_{R,i})]$$

$$E_{Ref}(t)=A_{Ref}(t)\exp[-i(\omega t+\phi_{Ref})] \qquad \text{Eq. 5}$$

Here, $A_s(t)$ represents signal light transmitted by the R-SOA 51, that is, the signal $S_d(t)$ of FIG. 8.

In the first balanced coherent receiver 712, the detection current may be expressed as Equation 6 below, which is $\cos(\phi_S-\phi_{Ref})$ of an optical signal having vertical polarization, as described in Equation 3.

$$A_S^\uparrow(t)A_{ref}^\uparrow(t)\cos(\phi_S-\phi_{ref})+A_r^\uparrow(t)A_{ref}^\uparrow(t)\cos(\phi_S-\phi_r) \qquad \text{Eq. 6}$$

Here, $\phi_S$ and $\phi_{Ref}$ represent the phases of the signal light and the reference light.

At this time, when the detection current of Equation 6 is passed through the HPF to remove reflected noise, the detection current may be expressed as Equation 7 below.

$$A_S^\uparrow(t)A_{ref}^\uparrow(t)\cos(\phi_S-\phi_{ref}) \qquad \text{Eq. 7}$$

When the detection current of Equation 7 is divided into two currents, a part of the divided currents may be delayed by one bit and inputted to a mixer, and the other part may be directly inputted to the mixer. Then, it is possible to acquire an output expressed as Equation 8 below.

$$A_S^\uparrow(t)A_S^\uparrow(t-T)A_{ref}^{\uparrow 2}(t)\cos^2(\phi_S-\phi_{ref})=S_d^\uparrow(t)S_d^\uparrow(t-T)$$
$$A_{ref}^{\uparrow 2}(t)\cos^2(\phi_S-\phi_{ref}) \qquad \text{Eq. 8}$$

At this time, the mixer operates according to the truth table of FIG. 8. Therefore, when Equation 4 is substituted for Equation 8, the first balanced coherent 712 has an output expressed as Equation 9 below.

$$\begin{aligned}
A_S^\uparrow(t)A_S^\uparrow(t-T)A_{ref}^{\uparrow 2}(t)\cos^2(\phi_S-\phi_{ref}) \quad &\text{Eq. 9}\\
=S_d^\uparrow(t)S_d^\uparrow(t-T)A_{ref}^{\uparrow 2}(t)\cos^2(\phi_S-\phi_{ref})\\
=S^\uparrow(t)S_d^\uparrow(t-T)S_d^\uparrow(t-T)A_{ref}^{\uparrow 2}(t)\cos^2(\phi_S-\phi_{ref})\\
=S^\uparrow(t)A_{ref}^{\uparrow 2}(t)\cos^2(\phi_S-\phi_{ref})
\end{aligned}$$

Meanwhile, when the first delay 713 controls the optical signal such that a phase difference of 90 degrees occurs, the second balanced coherent receiver 714 has an output expressed as Equation 10 below, through the above-described process.

$$\begin{aligned}
A_S^\uparrow(t)A_S^\uparrow(t-T)A_{ref}^{\uparrow 2}(t)\sin^2(\phi_S-\phi_{ref}) \quad &\text{Eq. 10}\\
=S_d^\uparrow(t)S_d^\uparrow(t-T)A_{ref}^{\uparrow 2}(t)\sin^2(\phi_S-\phi_{ref})\\
=S^\uparrow(t)S_d^\uparrow(t-T)S_d^\uparrow(t-T)A_{ref}^{\uparrow 2}(t)\sin^2(\phi_S-\phi_{ref})\\
=S^\uparrow(t)A_{ref}^{\uparrow 2}(t)\sin^2(\phi_S-\phi_{ref})
\end{aligned}$$

Meanwhile, when the first electrical signal adder 723 adds the signal currents of Equation 9 and Equation 10, it is possible to acquire a signal current expressed as Equation 11 below. That is, it is possible to acquire a signal current of signal light having horizontal polarization, regardless of the phase of upward signal light.

$$S^\uparrow(t)A_{ref}^{\uparrow 2}(t)\sin^2(\phi_S-\phi_{ref})+S^\uparrow(t)A_{ref}^{\uparrow 2}(t)\cos^2(\phi_S-\phi_{ref})=$$
$$S^\uparrow(t)A_{ref}^{\uparrow 2}(t) \qquad \text{Eq. 11}$$

Through the above-described process, signal currents may be also acquired by the third balanced coherent receiver 718 and the fourth balanced coherent receiver 721 of FIG. 10. When the second electrical signal adder 724 adds the signal currents, it is possible to acquire a signal current of signal light having vertical polarization, regardless of the phase of upward signal light.

Furthermore, when the third electrical signal adder 725 adds the output signal current of the first electrical signal adder 723 and the output signal current of the second electrical signal adder 724, it is possible to acquire a signal current of upward signal light having no relation to the polarization.

The optical detection apparatus and method in accordance with the third embodiment of the present invention may perform the optical detection without tracing the polarization and phase of the upward signal light, that is, without performing real-time polarization control and real-time phase control.

In the optical detection apparatus and method in accordance with the third embodiment of the present invention, the plurality of phase controllers, the plurality of balanced coherent receivers, and the plurality of electrical signal adders are provided to detect an electrical signal corresponding to upward signal light by using a plurality of seed lightwaves having different phases. Therefore, the optical detection may be performed more precisely and effectively.

Figure 11:
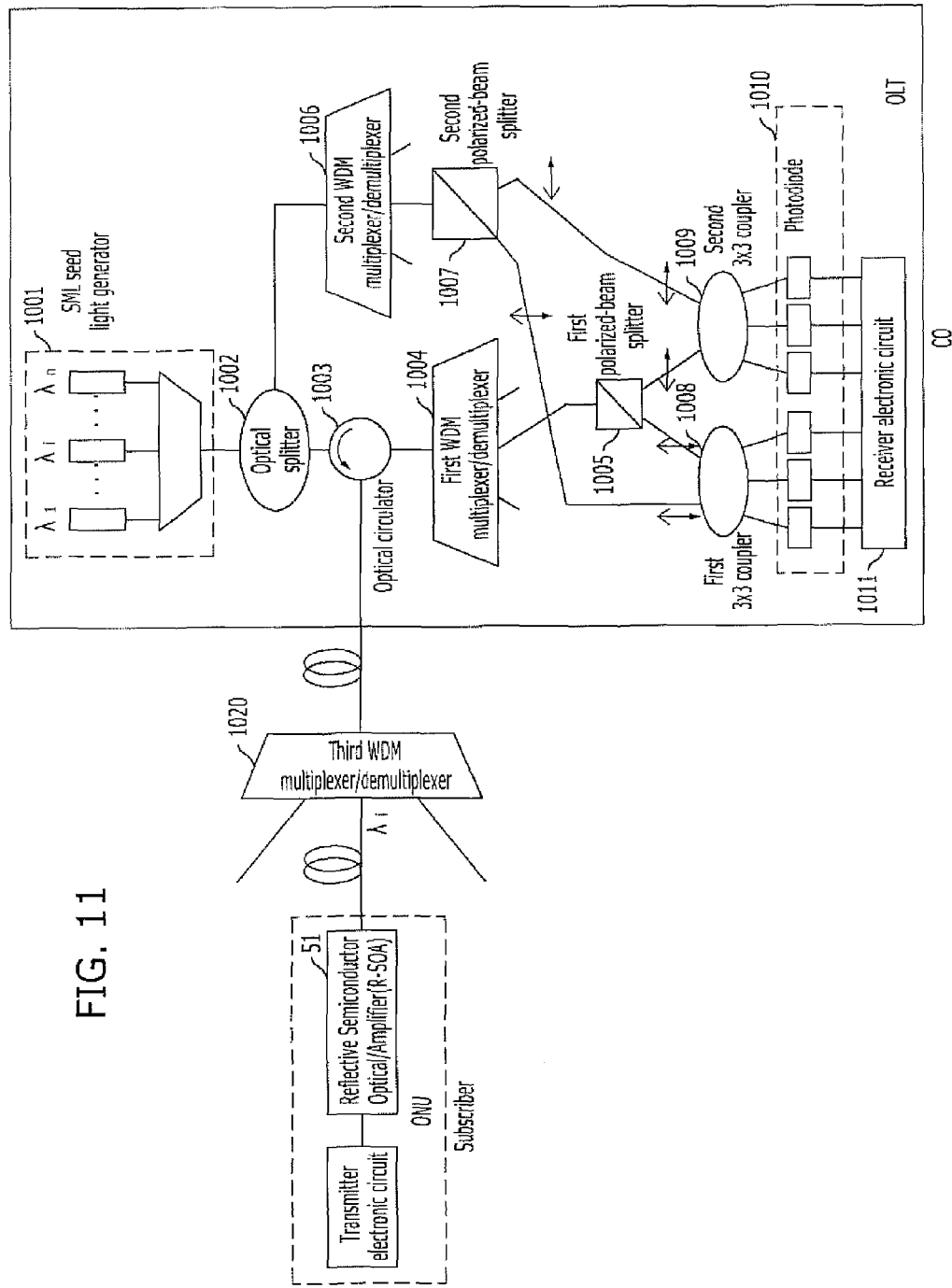
FIG. 11 is a configuration diagram of an optical detection apparatus in accordance with another modification of the third embodiment of the present invention.
Figure 12:
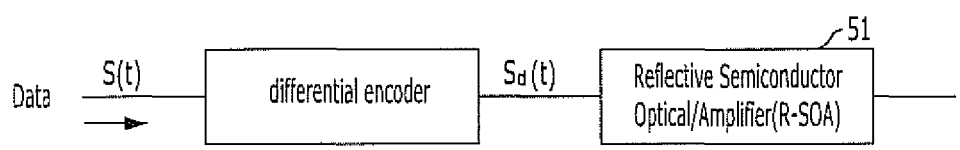
FIG. 12 is a diagram illustrating an example of a transmitter for explaining a modulation process used in the present invention.
Figure 13:
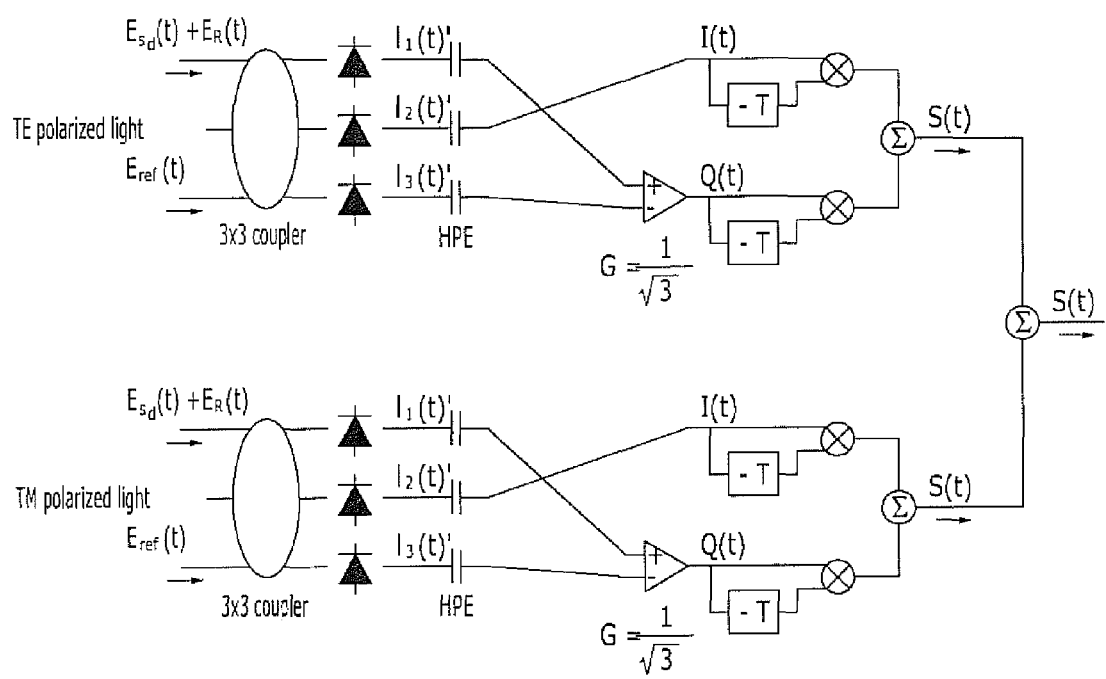
FIG. 13 is a diagram illustrating an example of a receiver for explaining a differential decoding process used in the present invention.
Figure 14:
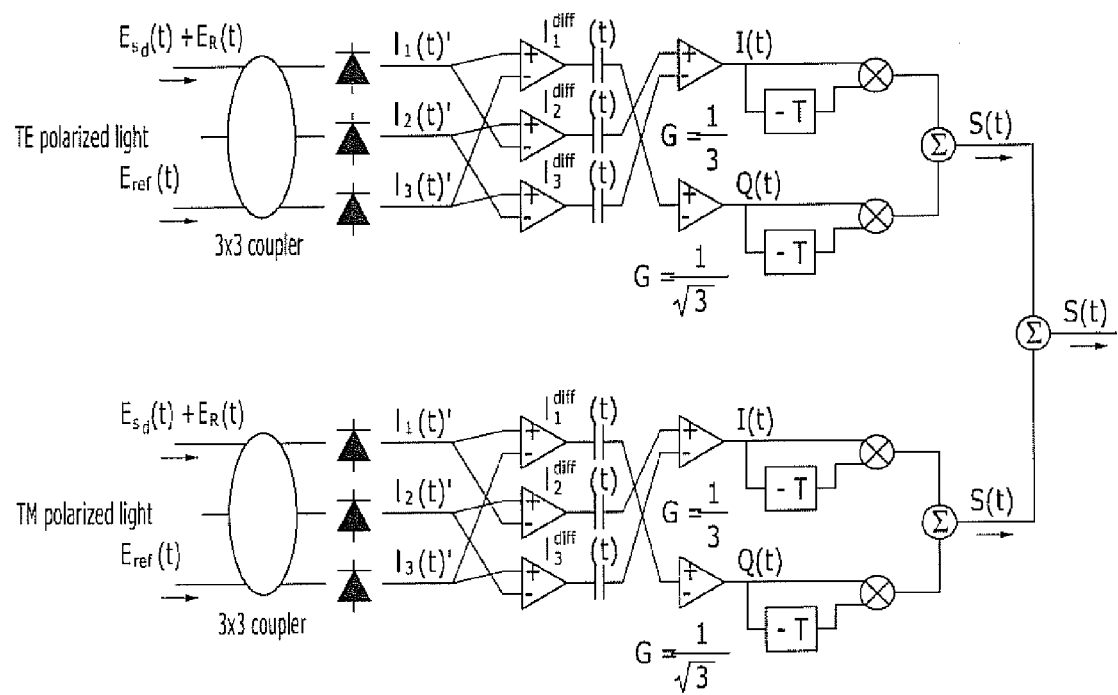
FIG. 14 is a diagram illustrating another example of the receiver for explaining the differential decoding process used in the present invention.

FIG. 11 is a configuration diagram of an optical detection apparatus in accordance with another modification of the third embodiment of the present invention. FIG. 12 is a diagram illustrating an example of a transmitter for explaining a modulation process used in the present invention. FIG. 13 is a diagram illustrating an example of a receiver for explaining a differential decoding process used in the present invention. FIG. 14 is a diagram illustrating another example of the receiver for explaining the differential decoding process used in the present invention.

Referring to FIG. 11, the optical detection apparatus in accordance with the modification of the third embodiment of the present invention is provided in the CO side, and includes a single mode laser (SML) seed light generator 1001, an optical splitter 1002, an optical circulator 1003, a first WDM multiplexer/demultiplexer 1004, a first polarized-beam splitter 1005, a second WDM multiplexer/demultiplexer 1006, a second polarized-beam splitter 1007, a first 3×3 coupler 1008, a second 3×3 coupler 1009, a photodiode 1010, and a receiver electronic circuit 1011. Meanwhile, a third WDM multiplexer/demultiplexer 1020 is provided on an optical line, and an R-SOA 51 is provided in an ONU in the subscriber side.

The ONU in the subscriber side modulates a seed lightwave received from an OLT in the CO side into upward signal light having no DC component by using the R-SOA or the like, that is, generates upward signal light which does not include a frequency component of reflected noise, based on the received seed lightwave, and transmits the upward signal light to the OLT.

Hereafter, a transmission path (operation) of the seed lightwave provided by the CO side and a transmission path (operation) of the upward signal light transmitted by the subscriber side in accordance with the modification of the third embodiment of the present invention will be described. Referring to this, the optical detection apparatus and method in accordance with the modification of the embodiment of the present invention will be described as follows.

FIG. 11 shows an example in which a WDM-PON is configured by using the above-described optical detection method. First, when the SML seed lightwave generator 1001 generates seed lightwaves having wavelengths $\lambda_1 \ldots, \lambda_i \ldots, \lambda_n$ and outputs the generated seed lightwaves to the optical splitter 1002, the optical splitter 1002 splits the seed lightwaves, and transmits some of the seed lightwaves to the optical line through the optical circulator 1003. Then, the third WDM multiplexer/demultiplexer 1020 existing on the optical line splits the seed lightwave, and injects a seed lightwave having a wavelength of into the R-SOA 51 provided in the ONU.

Meanwhile, the R-SOA 51 modulates the injected seed lightwave into upward signal light having no DC component, that is, generates upward signal light which does not include a frequency component of reflected noise, and transmits the upward signal light to the optical line. In other words, the R-SOA 51 modules and amplifies the injected seed lightwave by using an upward signal which is coded so as not to include a frequency component smaller than the line width of the seed lightwave, and transmits upward signal light which does not include a frequency component of the seed lightwave corresponding to the line width of reflected light. At this time, differential encoding is performed so that a receiver in the OLT side easily detects the upward signal light. Referring to FIG. 12, when data to be transmitted is S(t) and is encoded into $S_d(t)$ by the differential encoding, a relation of $S_d(t) = S(t) \otimes S_d(t-T)$ is established. Here, $\otimes$ represents an exclusive XNOR operation, and T represents one bit period.

The upward signal light is WDM-multiplexed with upward signal light having a different wavelength by the third WDM multiplexer/demultiplexer 1020 along the optical line, and then inputted to the optical circulator 1003 of the OLT. Then, the upward signal light is inputted to the first WDM multiplexer/demultiplexer 1004 through the optical circulator 1003, and demultiplexed (wavelength-divided). Upward signal light having a wavelength of $\lambda_i$ is inputted to the first polarized-beam splitter 1005.

The first polarized-beam splitter 1005 splits the upward signal light into an optical signal having a transverse electric (TE) component and an optical signal having a transverse magnetic (TM) component. The first polarized-beam splitter 1005 transfers the upward signal light having a TE component, that is, the TE polarized light to the first 3×3 coupler 1008, and transfers the upward signal light having a TM component, that is, the TM polarized light to the second 3×3 coupler 1009.

Meanwhile, the other part of the seed lightwaves split by the optical splitter 1002 is demultiplexed (wavelength-divided) by the second WDM demultiplxer/multiplexer 1006. A seed lightwave having a wavelength of $\lambda_i$ is inputted to the second polarized-beam splitter 1007.

The second polarized-beam splitter 1007 splits the inputted seed lightwave into an optical signal having a TE component and an optical signal having a TM component. The second polarized-beam splitter 1007 transfers the seed lightwave having a TE component, that is, the TE polarized light to the first 3×3 coupler 1008, and transfers the seed lightwave having a TM component, that is, the TM polarized light to the second 3×3 coupler 1009.

Accordingly, the seed lightwave and the upward signal light inputted to the first and second 3×3 couplers 1008 and 1009 have the same polarization.

The TE-component upward signal light split by the first polarized-beam splitter 1005 and the TE-component seed lightwave split by the second polarized-beam splitter 1007 are inputted to two input terminals among three input terminals of the first 3×3 coupler 1008 to optically couple the signals. Then, the corresponding optical signals are outputted from three output terminals. That is, referring to FIG. 13, mixed light of the upward signal light and reflected light $(E_{s_d}(t) + E_R(t) = E_0 S_d(t)e^{i(\omega t + \phi_S)} + re^{i(\omega t + \phi_r)})$ and the reference light $(E_{ref}(t) = E_r e^{i(\omega t + \phi_{ref})})$ are inputted to the two input terminals of the first 3×3 coupler 1008 to optically couple the signals. Then, the corresponding optical signals are outputted from the three output terminals of the first 3×3 coupler 1008 and injected to three corresponding photodiodes among the plurality of photodiodes 101. Then, the three photodiodes 1010 converts the corresponding optical signals into electrical signals and outputs the converted electrical signals to the receiver electric circuit 101 (refer to FIG. 13 or 14). At this time, the respective detection currents which are converted and outputted by the three photodiodes 1010 may be expressed as Equations 12, 13, and 14 below (refer to A. W. Davis, M. J. Pettitt, J. P. King, S. Wright, "Phase diversity techniques for coherent optical receivers", J. of Lightw. Technol., vol. LT-5, no. 4, pp 561~572, April, 1987.)

$$I_1(t)' = R\left[\frac{E_{S_d}(t)}{\sqrt{3}} + \frac{E_R(t)}{\sqrt{3}} + \frac{E_{ref}(t)}{\sqrt{3}}e^{i(2\pi/3)}\right]\left[\frac{E_{S_d}(t)}{\sqrt{3}} + \frac{E_R(t)}{\sqrt{3}} + \frac{E_{ref}(t)}{\sqrt{3}}e^{i(2\pi/3)}\right]^* \quad \text{Eq. 12}$$

$$I_2(t)' = \quad \text{Eq. 13}$$
$$R\left[\frac{E_{S_d}(t)}{\sqrt{3}} + \frac{E_R(t)}{\sqrt{3}}e^{i(\pi/3)} + \frac{E_{ref}(t)}{\sqrt{3}}e^{i(2\pi/3)}\right]\left[\frac{E_{S_d}(t)}{\sqrt{3}} + \frac{E_R(t)}{\sqrt{3}}e^{i(\pi/3)} + \frac{E_{ref}(t)}{\sqrt{3}}e^{i(2\pi/3)}\right]^*$$

$$I_3(t)' = R\left[\frac{E_{S_d}(t)}{\sqrt{3}} + \frac{E_R(t)}{\sqrt{3}}e^{i(2\pi/3)} + \frac{E_{ref}(t)}{\sqrt{3}}\right]\left[\frac{E_{S_d}(t)}{\sqrt{3}} + \frac{E_R(t)}{\sqrt{3}}e^{i(\pi/3)} + \frac{E_{ref}(t)}{\sqrt{3}}\right]^* \quad \text{Eq. 14}$$

Meanwhile, the detection currents expressed as Equations 12 to 14 are passed through the HPF to pass only components equal to or more than a frequency corresponding to the line width of the reflected light or seed lightwave, and reference light having a larger intensity than the upward signal light is injected. Then, reflected noise and $E_{s_d}(t)^2$ for pure upward signal light may be ignored. Accordingly, Equations 12 to 14 may be expressed as Equations 15 to 17 below.

$$I_1(t) = R\left[\frac{E_l E_o S_d(t)}{3}\cos\left(\Delta\phi - \frac{2\pi}{3}\right)\right] \quad \text{Eq. 15}$$
$$= \frac{RE_l E_o S_d(t)}{3}\left[\cos(\Delta\phi)\cos\left(\frac{2\pi}{3}\right) + \sin(\Delta\phi)\sin\left(\frac{2\pi}{3}\right)\right]$$
$$= \frac{RE_l E_o S_d(t)}{3}\left[-\frac{1}{2}\cos(\Delta\phi) + \frac{\sqrt{3}}{2}\sin(\Delta\phi)\right]$$

$$I_2(t) = \frac{RE_l E_o S_d(t)}{3}\cos(\Delta\phi) \quad \text{Eq. 16}$$

$$I_3(t) = R\left[\frac{E_l E_o S_d(t)}{3}\cos\left(\Delta\phi + \frac{2\pi}{3}\right)\right] \quad \text{Eq. 17}$$
$$= \frac{RE_l E_o S_d(t)}{3}\left[\cos(\Delta\phi)\cos\left(\frac{2\pi}{3}\right) - \sin(\Delta\phi)\sin\left(\frac{2\pi}{3}\right)\right]$$
$$= \frac{RE_l E_o S_d(t)}{3}\left[-\frac{1}{2}\cos(\Delta\phi) - \frac{\sqrt{3}}{2}\sin(\Delta\phi)\right]$$

In Equations 15 to 17, $\Delta\phi$ is equal to $\phi_S - \phi_{ref}$ ($\Delta\phi = (\phi_S - \phi_{ref})$).

Equations 15 to 17 may be linearly combined to obtain an in-phase term (I(t)) $\cos(\Delta\phi)$ and a quadrature term (Q(t)) $\sin(\Delta\phi)$.

For example, the in-phase term (I(t)) and the quadrature phase term (Q(t)) may be expressed as Equations 18 and 19 below.

$$I(t) = I_2(t) \quad \text{Eq. 18}$$

$$Q(t) = \frac{[I_1(t) - I_3(t)]}{\sqrt{3}} \quad \text{Eq. 19}$$

Therefore, as shown in FIG. 13, when $I_2(t)$ becomes I(t), $I_2(t)$ is subtracted from $I_1(t)$, and a gain of $$\frac{1}{\sqrt{3}}$$

is provided, it is possible to acquire Q(t). Furthermore, as shown in FIG. 13, one bit of the in-phase term is delayed, and the delayed in-phase term is multiplied by the corresponding in-phase term through a mixer. One bit of the quadrature phase term is delayed, and the delayed quadrature phase term is multiplied by the corresponding quadrature phase term through another mixer. Then, the results may be expressed as Equations 20 and 21 below. At this time, since the input signals of the respective mixers are AC signals, the mixers operate as an exclusive XOR operator.

$$S_I(t) = [E_l E_0 S_d(t)\cos(\Delta\phi)] \otimes [E_l E_0 S_d(t-T)\cos(\Delta\phi)] \quad \text{Eq. 20}$$
$$= E_l^2 E_0^2 S(t)[\cos(\Delta\phi)]^2$$

$$S_Q(t) = [E_l E_0 S_d(t)\sin(\Delta\phi)] \otimes [E_l E_0 S_d(t-T)\sin(\Delta\phi)] \quad \text{Eq. 21}$$
$$= E_l^2 E_0^2 S(t)[\sin(\Delta\phi)]^2$$

Therefore, the TM-component signal of the signal to be transmitted may be acquired according to Equation 22 which is expressed by adding Equations 20 and 21.

$$S(t) = \frac{S_I(t) + S_Q(t)}{E_L^2 E_0^2} \quad \text{Eq. 22}$$

Meanwhile, the TM-component upward signal split by the first polarized-beam splitter 1005 and the TM-component seed lightwave split by the second polarized-beam splitter 1007 are inputted to two input terminals among three input terminals of the second 3×3 coupler 1009 to optically couple the signals. Then, the corresponding optical signals are outputted from three output terminals of the second 3×3 coupler 1009. That is, referring to FIG. 13, mixed light of the upward signal light and the reflected light and reference light are inputted to the two input terminals of the second 3×3 coupler 1009 to optically couple the signals. Then, the corresponding optical signals are outputted from the three output terminals of the second 3×3 coupler 1009, and injected to three photodiodes among the plurality of photodiodes 1010. The three photodiodes 1010 converts the corresponding optical signals into electrical signals, and outputs the electrical signals to the receiver electronic circuit 1011.

After that, a TM-component signal having the form of Equation 22 may be obtained by mixing the TM-component upward signal with the reference light through the same method as the above-described processing method of the TE-component signal. Then, as the TE polarization component signal and the TM polarization component are added to detect an upward signal corresponding to the upward signal light, it is possible to remove the polarization dependency of the signal light.

Meanwhile, as another example of the receiver, a receiver may be configured in such a manner as shown in FIG. 14. That is, the detection currents of Equations 12 to 14 may be subtracted from each other to obtain current signals expressed as Equations 23 to 25 below.

$$I_1^{diff}(t) = I_1(t)' - I_3(t)' \qquad \text{Eq. 23}$$
$$= \frac{RE_lE_0S_d(t)}{3}\sqrt{3}\sin(\Delta\phi)$$

$$I_2^{diff}(t) = I_2(t)' - I_1(t)' \qquad \text{Eq. 24}$$
$$= \frac{RE_lE_0S_d(t)}{3}\left[\frac{3}{2}\cos(\Delta\phi) - \frac{\sqrt{3}}{2}\sin(\Delta\phi)\right]$$

$$I_3^{diff}(t) = I_3(t)' - I_2(t)' \qquad \text{Eq. 25}$$
$$= \frac{RE_lE_0S_d(t)}{3}\left[-\frac{3}{2}\cos(\Delta\phi) - \frac{\sqrt{3}}{2}\sin(\Delta\phi)\right]$$

As expressed in Equations 23 to 25, when the detection currents are subtracted from each other, beating components of the upward signal light and the reflected light, reference light terms, and signal light terms are offset by each other, and only $E_0S_d(t)E_t\cos(\phi_S-\phi_{ref})$ and $rE_t\cos(\phi_S-\phi_{ref})$ remain. Here, $E_0S_d(t)E_t\cos(\phi_S-\phi_{ref})$ is a beating component of the reference light and the signal light, and $rE_t\cos(\phi_S-\phi_{ref})$ is a beating component of the reference light and the reflected light. Furthermore, the beating component of the reference light and the reflected light may be removed by the HPF.

Furthermore, as Equations 23 to 25 are linearly combined, I(t) and Q(t) may be obtained according to Equations 26 and 27 below.

$$I(t) = \frac{\left[I_2^{diff}(t) - I_3^{diff}(t)\right]}{3} \qquad \text{Eq. 26}$$

$$Q(t) = \frac{I_1^{diff}(t)}{\sqrt{3}} \qquad \text{Eq. 27}$$

As in Equations 20 and 21, differential decoding may be performed on Equations 26 and 27 to restore the transmitted signal as in Equation 22.

The optical detection method in accordance with the modification of the third embodiment of the present invention is performed according to the following processing procedure. A seed lightwave is split, and upward signal light generated by an ONU is split on the basis of the seed lightwave. Furthermore, the split seed lightwave and the split upward signal light are coupled to a seed lightwave and upward signal light having the same polarization component, respectively, and the combined signals are converted into electrical signals. Reflected noise is removed from the converted electrical signals, and an upward signal corresponding to the upward signal light is detected on the basis of the electrical signals. The above-described process may be easily understood by those skilled in the art through the description of the apparatus. Therefore, the detailed descriptions thereof will be omitted.

In accordance with the embodiments of the present invention, the optical detection may be performed accurately by tracing the phases and polarizations of seed lightwaves and upward signal lights in real time, the optical detection may be performed accurately by tracing only the phases of seed lightwaves and upward signal lights in real time, or the optical detection may be performed accurately and effectively without tracing the phases and polarizations of seed lightwaves and upward signal lights in real time.

Furthermore, the coherent detection may be effectively performed to reduce an optical signal loss budget and an optical reflection tolerance.

Furthermore, as effect of noise caused by reflected light of the seed lightwaves may be reduced. Therefore, it is possible to use an optical line having a large loss between the OLT and the ONU in the WDM-PON.

While the present invention has been described with respect to the specific embodiments, it will be apparent to those skilled in the art that various changes and modifications may be made without departing from the spirit and scope of the invention as defined in the following claims.

The embodiments of the present invention may be used in a WDM-PON based on a laser seed lightwave.

What is claimed is:

1. An optical detection apparatus comprising:
   a first optical splitting unit configured to split a seed lightwave;
   a second optical splitting unit configured to split upward signal light generated by an optical network unit, based on the seed lightwave;
   a first control unit configured to control polarizations of the split seed lightwave based on a first electrical signal;
   a second control unit configured to control phases of the split seed lightwave based on a second electrical signal;
   an optical coupling and signal conversion unit configured to couple the seed lightwaves, of which the polarization and phase are controlled, and the split upward signal lights, convert the coupled optical signals into the first and second electrical signals, and transfer the first and second electrical signals to the first and second control units, respectively; and
   a signal detection unit configured to couple the seed lightwave, of which the polarization and phase are controlled, and the split upward signal light, convert the coupled signals into an optical signal, and detect an upward signal corresponding to the upward signal light.

2. The optical detection apparatus of claim 1, wherein the first control unit comprises:
   a first processor configured to set a polarization control value of the seed lightwave for the converted first electrical signal; and
   a polarization controller configured to control the polarizations of the split seed lightwaves according to control of the first processor.

3. The optical detection apparatus of claim 2, wherein the second control unit comprises:
   a second processor configured to set a phase control value of the seed lightwave for the converted second electrical signal; and
   a phase controller configured to control the phases of the split seed lightwaves according to control of the second processor.

4. The optical detection apparatus of claims 1, wherein the optical coupling and signal conversion unit comprises:
   a first balanced coherent receiver configured to couple a first seed lightwave, of which the polarization and phase are controlled, and split first upward signal light, and convert the coupled optical signal into the first electrical signal; and
   a second balanced coherent receiver configured to couple a second seed lightwave, of which the polarization and phase are controlled, and split second upward signal light, and convert the coupled optical signal into the second electrical signal.

5. The optical detection apparatus of claim 4, wherein the signal detection unit comprises:
   a third balanced coherent receiver configured to couple a third seed lightwave, of which the polarization and phase are controlled, and split third upward signal light, and converts the coupled optical signal into a third electrical signal; and an upward signal extractor configured to remove a DC component of the third electrical signal converted by the third balanced coherent receiver and extract an upward signal corresponding to the upward signal light.

6. The optical detection apparatus of claim 5, wherein the upward signal light does not contain a frequency component of reflected noise.

7. An optical detection apparatus comprising:
a first optical splitting unit configured to split a seed lightwave;
a second optical splitting unit configured to split upward signal light generated by an optical network unit, based on the seed lightwave;
a horizontal polarization controller configured to control horizontal polarization with respect to the split seed lightwaves;
a vertical polarization controller configured to control vertical polarization with respect to the split seed lightwaves;
a control unit configured to control phases of the seed lightwaves whose horizontal polarization is controlled and control phases of the seed lightwaves whose vertical polarization is controlled;
an optical coupling and signal conversion unit configured to couple the seed lightwaves of which the horizontal polarization and phase are controlled and the seed lightwaves of which the vertical polarization and phase are controlled and the split upward signal lights, respectively, converting the coupled optical signals into first, second, third and fourth electrical signals, and transferring the second and third electrical signals to the control unit to control the control unit; and
a signal detection unit configured to detect an upward signal corresponding to the upward signal light, based on the converted first and fourth electrical signals.

8. The optical detection apparatus of claim 7, wherein the control unit comprises:
a processor configured to set a phase control value for the seed lightwaves having horizontal polarizations and a phase control value for the seed lightwave having vertical polarization, based on the converted electrical signals;

a first phase controller configured to control the phases of the seed lightwaves whose horizontal polarization is controlled, according to the control of the processor; and
a second phase controller configured to control the phases of the seed lightwaves whose vertical polarization is controlled, according to the control of the processor.

9. The optical detection apparatus of claim 7, wherein the optical coupling and signal conversion unit comprises:
a first balanced coherent receiver configured to couple a first seed lightwave among the seed lightwaves, of which the horizontal polarization and phase are controlled, and first upward signal light among the split upward signal lights, and convert the coupled optical signal into the first electrical signal;
a second balanced coherent receiver configured to couple a second seed lightwave among the seed lightwaves, of which the horizontal polarization and phase are controlled, and second upward signal light among the split upward signal lights, and convert the coupled optical signal into the second electrical signal;
a third balanced coherent receiver configured to couple a third seed lightwave among the seed lightwaves, of which the vertical polarization and phase are controlled, and third upward signal light among the split upward signal lights, and convert the coupled optical signal into the third electrical signal; and
a fourth balanced coherent receiver configured to couple a fourth seed lightwave among the seed lightwaves, of which the vertical polarization and phase are controlled, and fourth upward signal light among the split upward signal lights, and convert the coupled optical signal into the fourth electrical signal.

10. The optical detection apparatus of claim 9, wherein the signal detection unit comprises:
an electrical signal adder configured to add the converted first and fourth electrical signals; and
an upward signal extractor configured to remove a DC component of the added electrical signal and extract the upward signal corresponding to the upward signal light.

11. The optical detection apparatus of claim 10, wherein the upward signal light does not contain a frequency component of reflected noise.

* * * * *